(12) United States Patent
Morikawa et al.

(10) Patent No.: US 9,740,291 B2
(45) Date of Patent: Aug. 22, 2017

(54) PRESENTATION SYSTEM, PRESENTATION APPARATUS, AND COMPUTER-READABLE RECORDING MEDIUM

(75) Inventors: Takeshi Morikawa, Takarazuka (JP); Kaitaku Ozawa, Itami (JP); Takeshi Minami, Amagasaki (JP); Daisuke Sakiyama, Kawanishi (JP); Kazuya Anezaki, Amagasaki (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 296 days.

(21) Appl. No.: 13/530,915

(22) Filed: Jun. 22, 2012

(65) Prior Publication Data
US 2013/0019178 A1 Jan. 17, 2013

(30) Foreign Application Priority Data
Jul. 11, 2011 (JP) .................................. 2011-153031

(51) Int. Cl.
| | | |
|---|---|---|
| *G06F 3/0481* | (2013.01) | |
| *G06F 3/01* | (2006.01) | |
| *G06F 3/03* | (2006.01) | |
| *G09B 5/08* | (2006.01) | |

(52) U.S. Cl.
CPC .............. *G06F 3/017* (2013.01); *G06F 3/011* (2013.01); *G06F 3/0304* (2013.01); *G09B 5/08* (2013.01)

(58) Field of Classification Search
CPC .... G06F 3/017; G06F 3/04883; G06F 3/0488; G06F 3/033; G06F 3/048; G06F 2203/04808; G06F 3/0481; G06F 17/30032; G06F 3/01; H04N 21/44218; H04N 21/4223; H04H 60/31
USPC .............. 715/731, 730, 862, 863; 725/10–12
See application file for complete search history.

(56) References Cited

U.S. PATENT DOCUMENTS

| | | | | |
|---|---|---|---|---|
| 6,208,359 | B1 * | 3/2001 | Yamamoto | G06T 13/205 |
| | | | | 345/473 |
| 6,346,933 | B1 * | 2/2002 | Lin | 345/157 |
| 7,379,560 | B2 * | 5/2008 | Bradski et al. | 382/103 |

(Continued)

FOREIGN PATENT DOCUMENTS

| | | |
|---|---|---|
| JP | 2004-314855 | 11/2004 |
| JP | 2005-063092 | 3/2005 |

(Continued)

OTHER PUBLICATIONS

Hongo, Hitoshi, Akira Murata, and Kazuhiko Yamamoto. "Consumer products user interface using face and eye orientation." Consumer Electronics, 1997. ISCE'97., Proceedings of 1997 IEEE International Symposium on. IEEE, 1997.*

(Continued)

*Primary Examiner* — Reza Nabi
(74) *Attorney, Agent, or Firm* — Buchanan Ingersoll & Rooney PC

(57) ABSTRACT

A presentation system includes the following: a reception unit that receives a start instruction to start a presentation, a detection unit that starts detecting a gesture of a presenter in response to the start instruction, and a control unit that controls an operation for distributing presentation material, based on a detail of detection of the gesture.

50 Claims, 22 Drawing Sheets

(56) References Cited

U.S. PATENT DOCUMENTS

| | | | | |
|---|---|---|---|---|
| 8,011,583 | B2* | 9/2011 | Lei | G06K 7/10712 |
| | | | | 235/438 |
| 8,014,567 | B2* | 9/2011 | Yoon et al. | 382/103 |
| 8,170,929 | B1* | 5/2012 | Mallon | G06Q 10/0875 |
| | | | | 705/1.1 |
| 8,949,382 | B2* | 2/2015 | Cornett | H04L 41/0806 |
| | | | | 709/220 |
| 9,317,175 | B1* | 4/2016 | Lockhart | G06F 3/04815 |
| 2003/0191805 | A1* | 10/2003 | Seymour | H04L 67/42 |
| | | | | 709/204 |
| 2006/0192775 | A1* | 8/2006 | Nicholson | A61F 4/00 |
| | | | | 345/211 |
| 2008/0062891 | A1* | 3/2008 | Van der Merwe | H04L 45/04 |
| | | | | 370/254 |
| 2008/0109724 | A1* | 5/2008 | Gallmeier et al. | 715/716 |
| 2010/0079677 | A1 | 4/2010 | Matsubara et al. | |
| 2010/0182220 | A1* | 7/2010 | Bathiche et al. | 345/7 |
| 2010/0306249 | A1* | 12/2010 | Hill | G06F 17/30867 |
| | | | | 707/769 |
| 2011/0025818 | A1* | 2/2011 | Gallmeier et al. | 348/14.07 |
| 2011/0252248 | A1* | 10/2011 | Cameron | G06Q 10/04 |
| | | | | 713/300 |
| 2012/0079435 | A1* | 3/2012 | Chuang | G06F 3/017 |
| | | | | 715/863 |
| 2012/0084694 | A1* | 4/2012 | Sirpal | G06F 1/1616 |
| | | | | 715/769 |
| 2013/0019178 | A1* | 1/2013 | Morikawa | G06F 3/011 |
| | | | | 715/731 |
| 2014/0129676 | A1* | 5/2014 | Zeng | H04W 4/18 |
| | | | | 709/217 |
| 2016/0286164 | A1* | 9/2016 | Kratz | H04N 7/15 |

FOREIGN PATENT DOCUMENTS

| | | |
|---|---|---|
| JP | 2006-312347 | 11/2006 |
| JP | 2009-037434 | 2/2009 |
| JP | 2010-079771 | 4/2010 |
| JP | 2010-205235 A | 9/2010 |

OTHER PUBLICATIONS

Froba, Bernhard, and Christian Kublbeck. "Robust face detection at video frame rate based on edge orientation features." Automatic Face and Gesture Recognition, 2002. Proceedings. Fifth IEEE International Conference on. IEEE, 2002.*

Lenman, Sören, Lars Bretzner, and Björn Thuresson. "Using marking menus to develop command sets for computer vision based hand gesture interfaces." Proceedings of the second Nordic conference on Human-computer interaction. ACM, 2002.*

Gorodnichy, Dimitry. "Video-based framework for face recognition in video." (2005).*

Davis, James W., and Serge Vaks. "A perceptual user interface for recognizing head gesture acknowledgements." Proceedings of the 2001 workshop on Perceptive user interfaces. ACM, 2001.*

Notification of Reasons for Rejection issued in Japanese Patent Application No. 2011-153031, mailed on Oct. 22, 2013.

* cited by examiner

PRESENTATION SYSTEM, PRESENTATION APPARATUS, AND COMPUTER-READABLE RECORDING MEDIUM

This application is based on Japanese Patent Application No. 2011-153031 filed on Jul. 11, 2011, the contents of which are hereby incorporated by reference.

BACKGROUND OF THE INVENTION

Technical Field

The present invention relates to a presentation system and a technique related thereto.

Related Art

Presentation apparatuses or the like involve a technique for detecting gestures of a presenter when giving a presentation (see JP 2010-205235A).

However, with the technique disclosed in JP 2010-205235A, a period of time for detecting gestures of a presenter is not clearly shown, and it is unclear as to when the gesture detection is started. For this reason, depending on the situation, there is the possibility that a gesture of a presenter made before the start of a presentation will be erroneously detected.

SUMMARY OF THE INVENTION

It is an object of the present invention to provide a presentation system capable of avoiding a situation in which a gesture made before the start of a presentation is erroneously detected, and a technique related thereto.

According to a first aspect of the present invention, a presentation system includes a reception unit that receives a start instruction to start a presentation, a detection unit that starts detecting a gesture of a presenter in response to the start instruction, and a control unit that controls an operation for distributing presentation material, based on a detail of detection of the gesture.

According to a second aspect of the present invention, a presentation system includes an image capturing apparatus for capturing an image of a presenter, and a presentation apparatus capable of communication with the image capturing apparatus. The presentation apparatus includes a reception unit that receives a start instruction to start a presentation, a detection unit that detects a gesture of the presenter based on an image captured by the image capturing apparatus, and a control unit that controls an operation for distributing presentation material, based on a detail of detection of the gesture. The detection unit starts detecting the gesture in response to the start instruction.

According to a third aspect of the present invention, a presentation apparatus includes a reception unit that receives a start instruction to start a presentation, a detection unit that starts detecting a gesture of a presenter in response to the start instruction, and a control unit that controls an operation for distributing presentation material, based on a detail of detection of the gesture.

According to a fourth aspect of the present invention, a non-transitory computer-readable recording medium records a program for causing a computer to execute the steps of a) receiving a start instruction to start a presentation, b) starting detecting a gesture of a presenter in response to the start instruction, and c) distributing presentation material based on a detail of detection of the gesture.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereinafter, embodiments of the present invention will be described with reference to the drawings.

1. System Configuration

Figure 1:
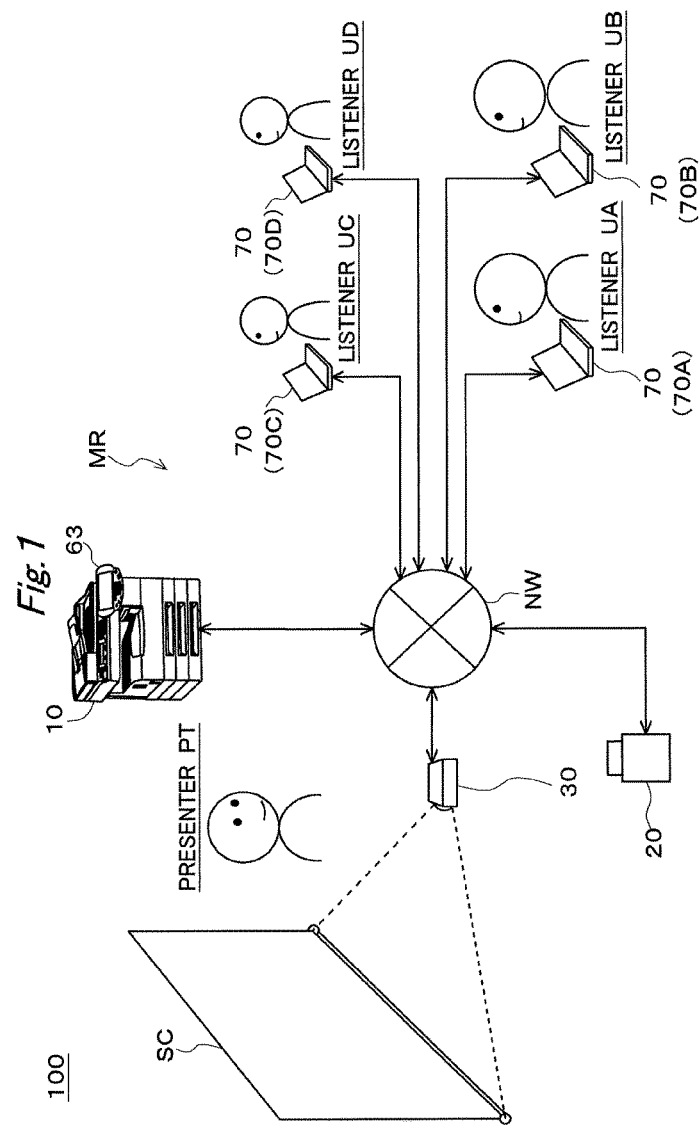
FIG. 1 is a conceptual diagram showing an overview of a presentation system according to an embodiment.

FIG. 1 is a system configuration diagram showing an overview of a presentation system 100. The presentation system 100 is also called a "teleconference system". The system 100 includes a presentation apparatus 10, a camera 20, a display output apparatus 30, and listener terminals 70.

The presentation apparatus 10, the camera 20, the display output apparatus 30, and the listener terminals 70 are connected to one another via a network NW and are capable of network communication. Here, the network NW is configured by, for example, a LAN, a WAN, or the Internet. The connection format of each apparatus to the network NW may be a wired connection or a wireless connection.

The presentation apparatus 10 is an apparatus that manages material BP to be presented in a presentation (also called "presentation material") and is also called a "management apparatus". The presentation apparatus 10 stores the presentation material BP and controls an operation for distributing the presentation material BP to each distribution destination.

Specifically, as will described later in detail, the presentation apparatus 10 detects a gesture GT of a presenter PT based on images captured by the camera 20 or the like. When the gesture GT has been detected, the presentation apparatus 10 distributes, for example, display data (specifically, a page image or the like) of the presentation material BP to the display output apparatus 30, the listener terminals 70, or the like, based on details of detection of the gesture GT.

Note that the presentation material BP includes main material MP and supplementary material SP. The main material MP is material that the presenter PT mainly uses when giving a presentation. The supplementary material SP is material that the presenter PT uses to supplement the main material MP, and is also called "additional material".

FIG. 1 also shows an inside view of a meeting room MR, which is a presentation venue. The left side in FIG. 1 corresponds to the front of the meeting room MR, and the right side in FIG. 1 corresponds to the back of the meeting room MR. Listeners UA to UD are each seated in the back (right side in FIG. 1) of the meeting room MR and listen to the presentation given by the presenter PT while looking toward a screen SC. The screen SC is set up in the forefront (left side in FIG. 1) of the meeting room MR, and an image output from the display output apparatus 30 is projected on the screen SC. The presenter PT stands approximately 1 to 2 meters back (toward the listener side) from and on the right side of the screen SC when viewed from the listeners UA to UD and gives a presentation while looking toward either the screen SC or the listeners UA to UD. In short, the presenter PT gives a presentation in the vicinity of the screen SC.

The camera 20 is disposed at a position at which an image of the presenter PT can be captured from the side of the presenter PT, and captures a moving image of the presenter PT.

The display output apparatus 30 is an apparatus that displays page images of presentation material. One example of the display output apparatus 30 is a projector apparatus. Presentation listeners (i.e., listeners UA, UB, UC, and UD) are able to visually recognize page images of the presentation material BP through the screen SC that is a display surface on which images output from the display output apparatus 30 are displayed.

Listener terminals 70A, 70B, 70C, and 70D are terminal apparatuses used by the presentation listeners UA, UB, UC, and UD. One example of each listener terminal 70 that is used is a personal computer. The listeners UA to UD are each able to display and browse presentation material, using their listener terminals 70A to 70D.

In the present embodiment, the presentation apparatus 10 is configured as an apparatus that also has an image forming function (image forming apparatus), and more specifically, as a Multi-Functional Peripheral (MFP).

Figure 2:
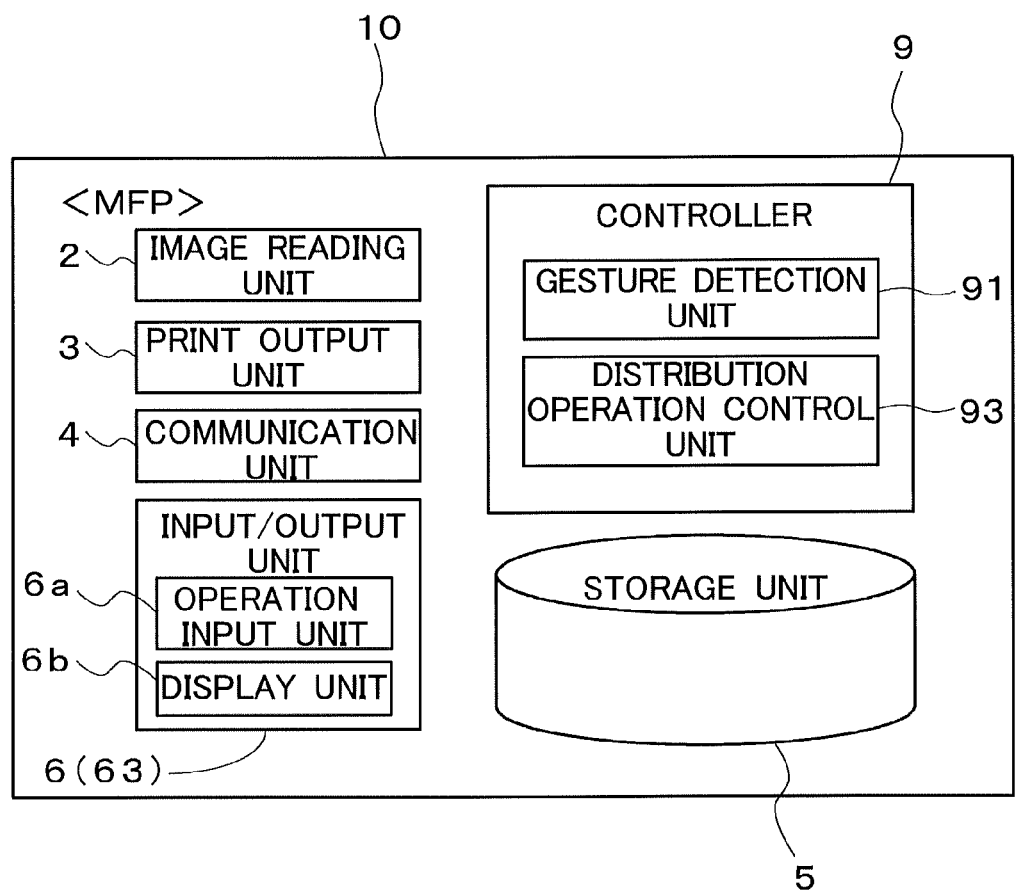
FIG. 2 is a block diagram showing a schematic configuration of a presentation apparatus.

FIG. 2 is a block diagram showing a schematic configuration of the presentation apparatus (MFP) 10.

As shown in the functional block diagram of FIG. 2, the presentation apparatus (MFP) 10 includes, for example, an image reading unit 2, a print output unit 3, a communication unit 4, a storage unit 5, an input/output unit 6, and a controller 9, and realizes various functions by causing these units to operate in combination.

The image reading unit (scanner unit) 2 is a processing unit that generates image data (also called an "scanned image") of an original document placed on a predetermined position of the presentation apparatus (MFP) 10 through optical reading processing for optically reading the original document. For example, the image reading unit 2 reads an original document placed on a predetermined position by the presenter PT and generates image data of the original document as the presentation material BP.

The print output unit 3 is an output unit that prints out an image on various media such as paper, based on data regarding an object to be printed.

The communication unit 4 is a processing unit capable of network communication via the communication network NW. This network communication uses various protocols such as TCP/IP (transmission control protocol/Internet protocol) and FTP (file transfer protocol). Using the network communication enables the presentation apparatus (MFP) 10 to exchange various types of data with the desired communication partner.

The storage unit 5 is configured by a storage device such as a hard disk drive. The storage unit 5 stores, for example, the presentation material BP generated by the image reading unit 2 and the like.

The input/output unit 6 includes an operation input unit 6a that receives input to the presentation apparatus (MFP) 10 and a display unit 6b that displays and outputs various types of information. Specifically, the presentation apparatus 10 is provided with an operation panel 63 (see FIG. 1) or the like. The operation panel (touch screen) 63 is configured by embedding piezoelectric sensors or the like in a liquid crystal display panel, and functions as not only part of the display unit 6b and but also part of the operation input unit 6a.

The controller 9 is a control apparatus that is built in the presentation apparatus (MFP) 10 and performs overall control of the presentation apparatus 10. The controller 9 is configured as a computer system that includes, for example, a CPU and various types of semiconductor memories (such as a RAM and a ROM). The controller 9 realizes various processing units by the CPU executing a predetermined software program (hereinafter, also referred to simply as a "program") PG stored in a ROM (e.g., an EEPROM). Note that the program PG is recorded on a portable recording medium such as a CD-ROM, a DVD-ROM, or a USB memory (in other words, various computer-readable non-transitory recording media) and is to be installed on the presentation apparatus 10 via the recording medium.

To be more specific, the controller 9 includes a gesture detection unit 91 and a distribution operation control unit 93 as shown in FIG. 2.

The gesture detection unit 91 is a processing unit that detects a gesture (hereinafter also called a "gesture GT") of the presenter PT based on an image captured by the camera 20 or the like. As described later, the gesture detection unit, 91 starts detecting a gesture GT in response to a start instruction to start a presentation.

The distribution operation control unit 93 is a processing unit that controls an operation for distributing the presentation material BP based on the details of detection of the gesture GT.

2. Operations

Next is a description of various operations performed by the presentation system 100.

In the presentation system 100, a presentation is started upon receipt of a start instruction from the presenter PT. Simultaneously with the start of the presentation, the detection of a gesture GT of the presenter PT based on an image captured by the camera 20 or the like is also started.

When a gesture GT of the presenter PT has been detected after the start of the presentation, the presentation material BP is distributed to each distribution destination based on the details of detection of the gesture GT. When detecting a gesture GT, the orientation of the face of the presenter PT is also detected, and a distribution destination of the presentation material BP is determined based on the orientation of the face.

Hereinafter, these operations will be described with reference to FIGS. 3 to 24. To be specific, (1) the operation for registering the presentation material BP, (2) the operation for starting a presentation, and (3) the operation for distributing the presentation material BP will be each described in the order specified.

(1) The presentation material BP is registered in advance in the presentation apparatus 10 by a host user (in the present example, the presenter PT) before the start of a presentation. Below is a detailed description of the operation for registering the presentation material BP with reference to FIGS. 3 to 6.

Figure 3:
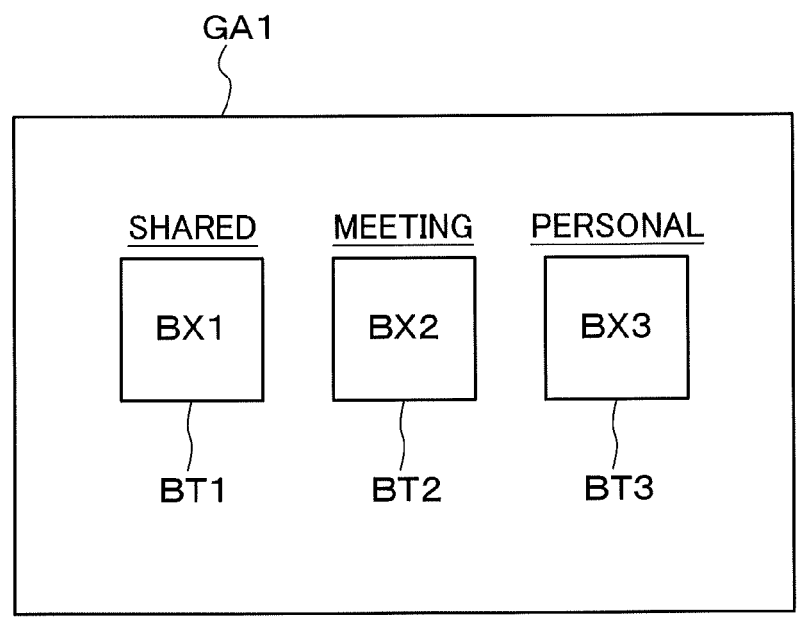
FIG. 3 shows a screen displayed on a touch screen.

First, in accordance with a predetermined operation by the presenter PT, a screen GA1 (see FIG. 3) is displayed on the touch screen 63. As shown in FIG. 3, three buttons BT1, BT2, and BT3, each corresponding to a different category (namely, "Shared", "Meeting", or "Individual"), are displayed in the screen GA1. The present embodiment illustrates a case in which the presentation material BP or the like for the presentation is to be registered in a box BX2 corresponding to the category "Meeting".

Figure 4:
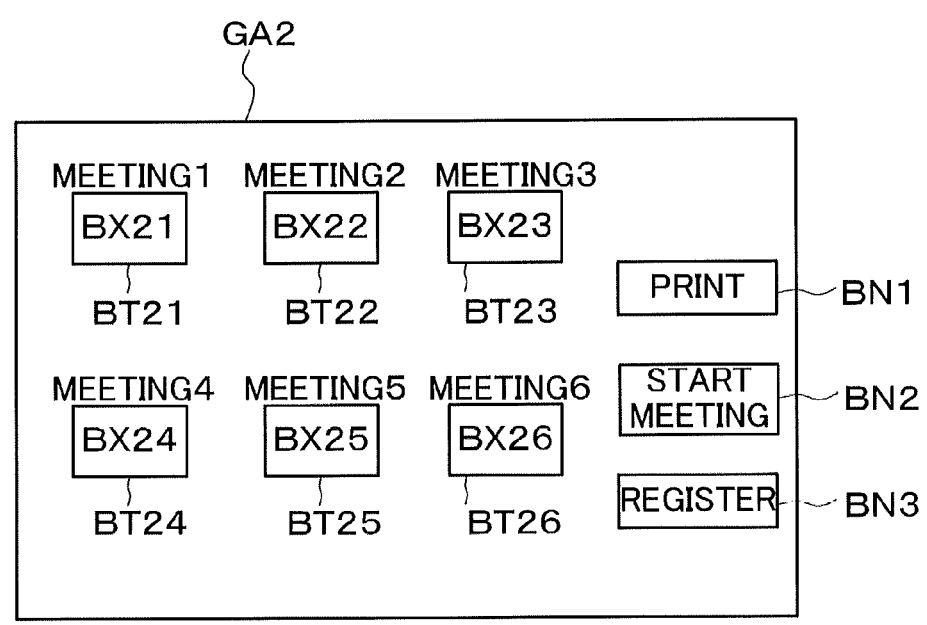
FIG. 4 shows a screen displayed on the touch screen.

When the button BT2 has been pressed on the above screen GA1, an operation screen GA2 (see FIG. 4) regarding the box BX2 is displayed on the touch screen 63. As shown in FIG. 4, six buttons BT21 to BT26 that correspond respectively to six boxes BX21 to BX26 are displayed in approximately the center of the screen GA2. On the right side of the screen GA2, buttons BN1 to BN3 for executing various operations are displayed. The button BN1 is a button for executing printing. The button BN2 is a button for giving an instruction to start a meeting (presentation). The button BN3 is a button for registering the presentation material BP in the boxes BX21 to BX26.

Figure 5:
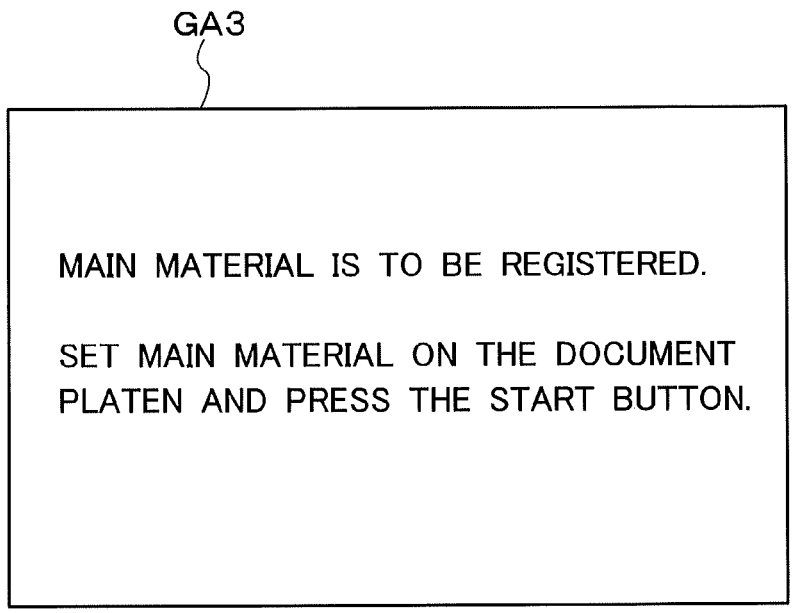
FIG. 5 shows a screen displayed on the touch screen.

This example shows a case in which the presentation material BP is to be registered in the box BX21 corresponding to "Meeting 1". First, when the button BT21 has been selected and the button BN3 has been pressed on the screen GA2, the presentation apparatus 10 displays a screen GA3 (see FIG. 5) on the touch screen 63. As shown in FIG. 5, a message reading "Main material is to be registered. Set main material on the document platen and press the start button." is displayed in approximately the center of the screen GA3.

Figure 6:
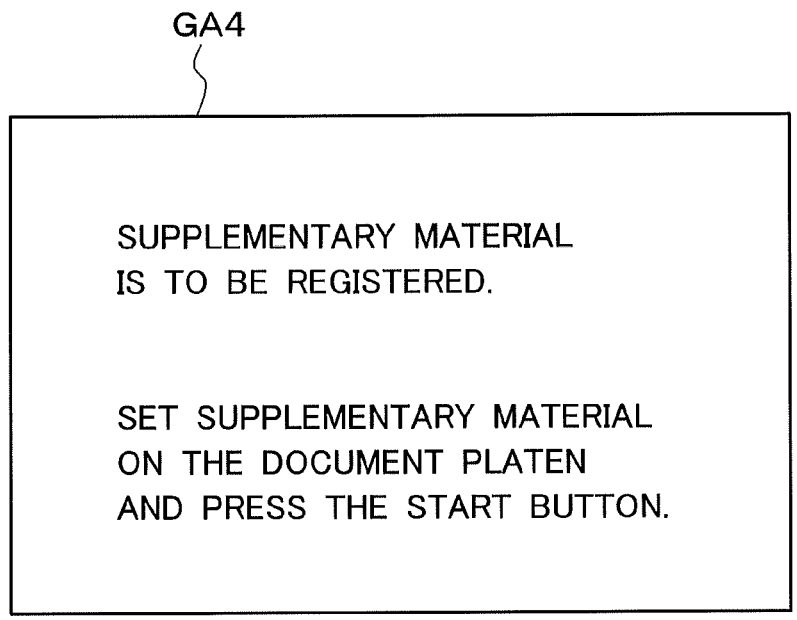
FIG. 6 shows a screen displayed on the touch screen.

Here, when the original document of the main material MP has been set on the document platen and the start button (not shown) has been pressed, the presentation apparatus 10 generates the main material MP by reading the original document and stores the main material MP in the box BX21. When the main material MP has been stored, the presentation apparatus 10 displays a screen GA4 (see FIG. 6) on the touch screen 63. As shown in FIG. 6, a message reading "Supplementary material is to be registered. Set supplementary material on the document platen and press the start button." is displayed in approximately the center of the screen GA4.

Then, when the original document of the supplementary material SP has been set on the document platen and the start button (not shown) has been pressed, the presentation apparatus 10 generates the supplementary material SP by reading the original document and stores the supplementary material SP in the box BX21. When the supplementary material SP has been stored, the presentation apparatus 10 displays, on the touch screen 63, a display screen (not shown) for displaying a message indicating that the main material MP and the supplementary material SP have been registered in the box BX21.

Note that although the present example shows the case in which the original documents are read by the image reading unit 2 and the main material SP and the supplementary material SP are generated and registered in the box BX21, the present invention is not limited to this example. For example, a configuration is also possible in which various files stored in an external apparatus are acquired as the main material MP and the supplementary material SP via the network NW and stored in the box BX21.

(2) Next, the operation for starting a presentation will be described with reference to FIG. 4.

First, the presenter PT causes the screen GA2 (see FIG. 4) to be displayed again on the touch screen 63 through a predetermined operation.

Thereafter, the presenter PT selects the button BT21 that corresponds to the box BX21 in which the main material MP and the supplementary material SP have been registered (stored) in advance, and presses the button BN2 for instructing the start of a presentation. The presentation apparatus 10 receives this operation of the presenter PT pressing the button BN2 as an instruction to start a presentation.

(3) Then, the operation for distributing the presentation material BP will be described with reference to the flowcharts of FIGS. 7 to 9.

Figure 7:
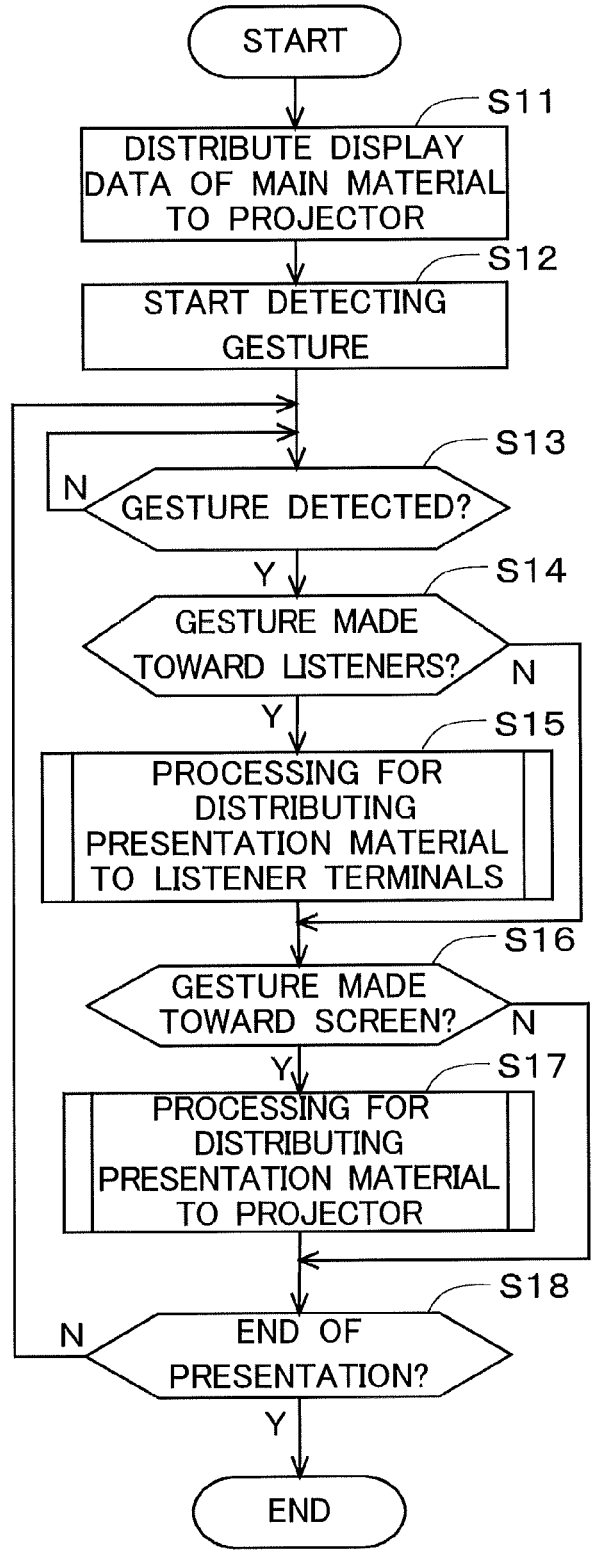
FIG. 7 is a flowchart showing an operation performed by the presentation apparatus.

When the instruction to start the presentation has been received, in step S11 in FIG. 7, the presentation apparatus 10 distributes data of the main material MP (specifically, a page image of the first page of the main material MP) to the display output apparatus 30. The display output apparatus 30 projects the distributed page image of the first page of the main material MP on the screen SC.

In step S12, the presentation apparatus 10 starts capturing an image of the presenter PT with the camera 20, and also starts detecting the gesture GT of the presenter PT, using the gesture detection unit 91. In this way, in response to the instruction to start a presentation, the gesture detection unit 91 starts detecting (monitoring) the gesture GT of the presenter PT.

Gestures GT1 to GT6 each consist of a common action CA in which the presenter PT once raises an arm upward to a position higher than that just beside his/her face, and an action that follows the common action CA and is unique to the gesture. Note that, in the present example, the common action CA is such that the presenter PT raises an arm with the elbow bent, and the elbow is still bent even when the arm has reached the position higher than that just beside the face. In other words, in the common action CA, the arm of the presenter PT is not fully extended. When the action CA common to the gestures GT1 to GT6 has been detected, it is determined that the gesture GT (one of the gestures GT1 to GT6) has started. Furthermore, the type of the gesture (i.e., which one of the gestures GT1 to GT6 has been made) can be detected by also detecting details of the unique action following the common action CA.

Figure 10:
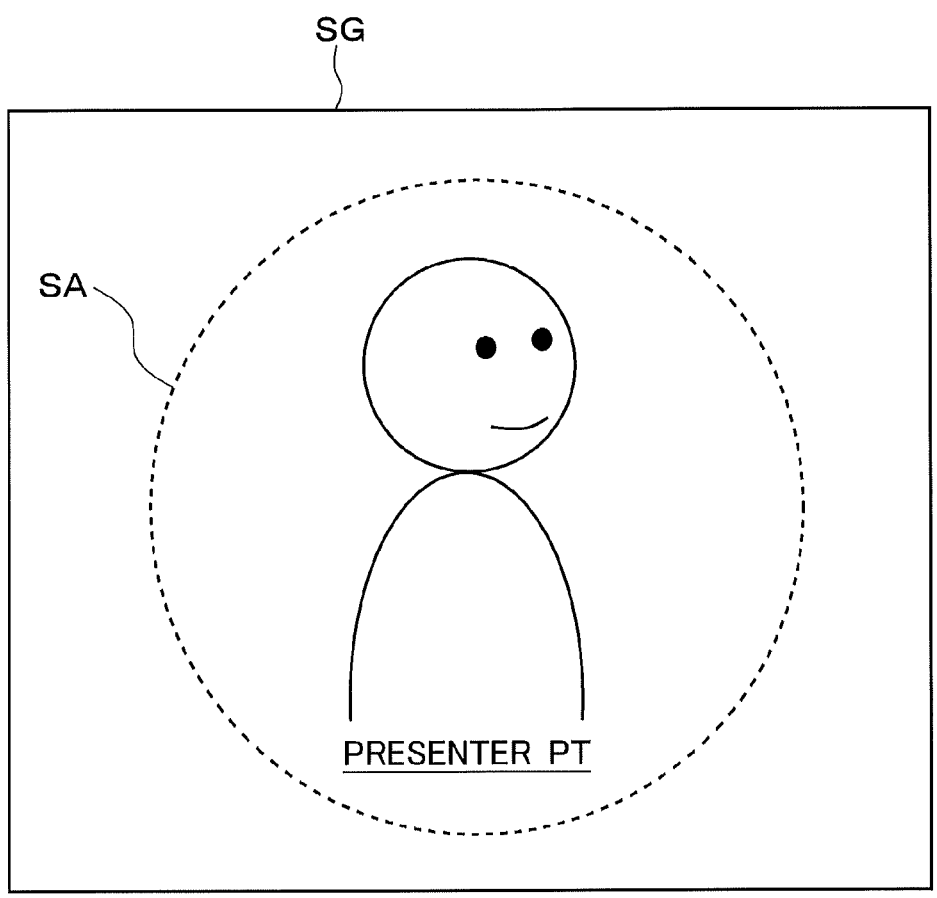
FIG. 10 shows an image captured by a camera.
Figure 11:
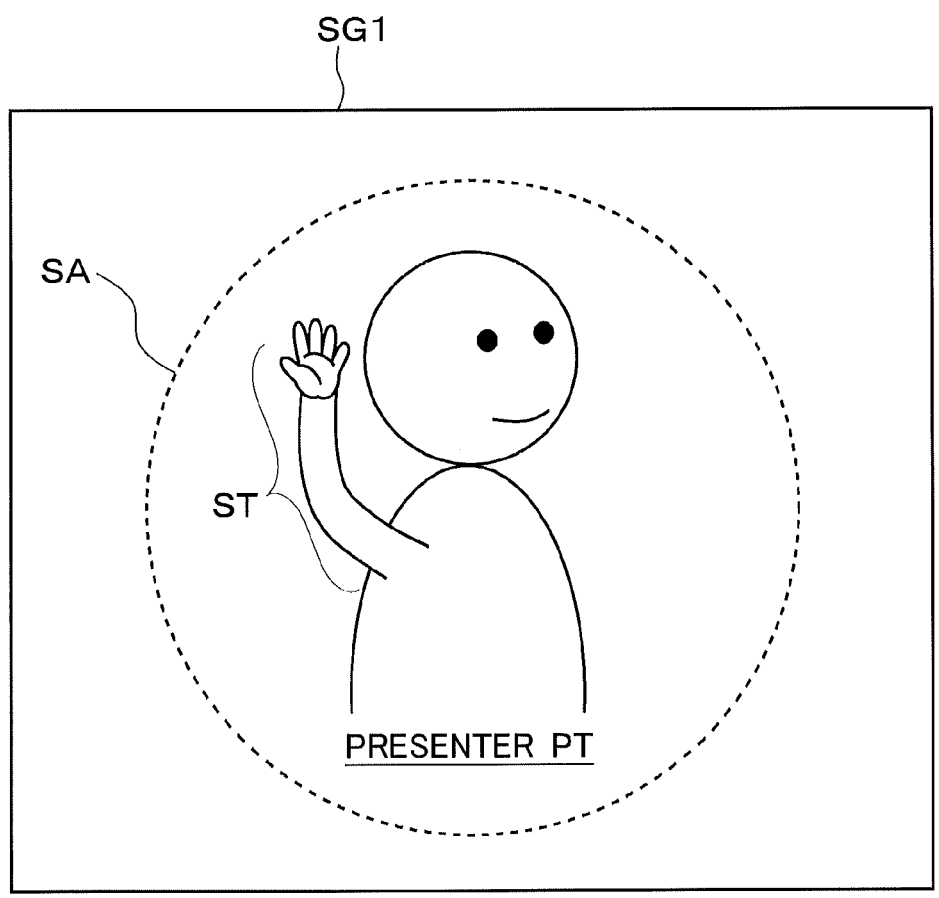
FIG. 11 shows an image captured by the camera.

To be more specific, as shown in FIG. 10, the presentation apparatus 10 starts monitoring a surrounding area SA that includes the presenter PT, based on an image SG captured by the camera 20. During the monitoring of the surrounding area SA, the gesture detection unit 91 performs matching processing between the image SG captured by the camera 20 and a comparative image HG (not shown) based on the image SG and the comparative image HG. The comparative image HG is an image obtained by capturing, in advance (before the start of the presentation), a state in which the presenter PT has raised an arm. For example, if an image SG1 (see FIG. 11) captured at a certain point in time and the comparative image HG match during monitoring of the surrounding area SA, the gesture detection unit 91 determines that the common action CA has been made. At the same time, the presentation apparatus 10 extracts the entire contour of the presenter PT from the captured image SG1 and further extracts an arm portion ST (see FIG. 11) of the presenter PT from the entire contour. Specifically, the presentation apparatus 10 first extracts a body portion from the entire contour of the presenter PT and then extracts a portion that projects (extends) upward (or diagonally upward) from the body portion as the arm portion ST (see FIG. 11) of the presenter PT.

Furthermore, details of the action that follows the common action CA is also detected together. Then, the fact that the gesture GT of the presenter PT has been detected and the type of that gesture (specifically, one of the gestures GT1 to GT6) are determined based on the common action and the action following the common action.

Figure 13:
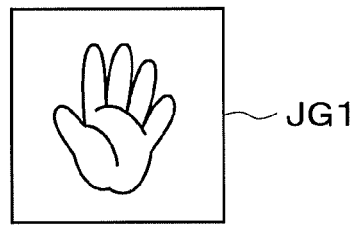
FIG. 13 shows a comparative image used in matching processing.
Figure 14:
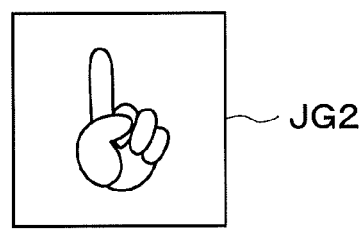
FIG. 14 shows a comparative image used in matching processing.

As will be described later, the gesture GT1 is a gesture in which the presenter PT extends five fingers upward (raises all fingers) (see FIG. 13), and the gesture GT2 is a gesture in which the presenter PT extends (raises) one finger upward (see FIG. 14). The gesture GT3 is a gesture in which the presenter PT extends (raises) three fingers upward (see FIG. 15). Furthermore, the gesture GT4 is a gesture in which the presenter PT who has raised the arm to beside the face moves that arm to the right (see FIG. 17), and the gesture GT5 is a gesture in which the presenter PT who has raised the arm to beside the face moves that arm to the left (see FIG. 18). The gesture GT6 is a gesture in which the presenter PT who has raised the arm to beside the face further moves, that arm upward (see FIG. 19).

It is, however, to be noted that as will be described later, these gestures GT1 to GT6 are also distinguished by the detection result of the orientation of the face of the presenter PT when detecting the gesture. Specifically, the gestures GT1 to GT3 are detected on condition that the orientation of the face of the presenter PT is an "orientation D1", which will be described later (steps S14 and S15). Furthermore, the gestures GT4 to GT6 are detected on condition that the orientation of the face of the presenter PT is an "orientation D2", which will be described later (steps S16 and S17).

In step S13 following step S12, it is determined whether or not the gesture GT of the presenter PT has been detected. If it has been determined that the gesture GT of the presenter PT has been detected, the procedure proceeds to step S14.

In step S14, it is determined whether or not the orientation of the face of the presenter PT at the time of detection of the gesture GT is the "orientation D1". Here, the orientation D1 is an orientation that is directed from the position where the presenter PT is present toward the listeners UA to UD, i.e., the "orientation toward the listeners". In other words, it is determined in step S14 whether or not the gesture GT of the presenter PT has been made toward the listeners UA to UD.

To be more specific, the presentation apparatus 10 performs matching processing between the captured image SG1 (see FIG. 11) and a comparative image IG1 (not shown). Note that the comparative image IG1 (not shown) is a still image obtained by the camera 20 capturing in advance the presenter PT from the side in a state in which the presenter PT directs the face toward the seat positions of the listeners.

As a result of the matching between the captured image SG1 and the image IG1, if it has been determined that the orientation of the face of the presenter PT at the time of detection of the gesture GT is the orientation D1, the procedure proceeds to step S15. In step S15, the processing for distributing the presentation material BP to the listener terminals 70 (see FIG. 8) is executed. Note that the processing for distributing the presentation material BP to the listener terminals 70 will be described later in detail.

On the other hand, as a result of the matching between the captured image SG1 and the image IG1, if it has been determined that the orientation of the face of the presenter PT at the time of detection of the gesture GT is not the orientation D1, the procedure proceeds to step S16.

In step S16, it is determined whether or not the orientation of the face of the presenter PT at the time of detection of the gesture GT is the "orientation D2". Here, the orientation D2 is an orientation that is directed from the position where the presenter PT is present toward the screen SC, i.e., the "orientation toward the screen". In other words, it is determined in step S16 whether or not the gesture GT of the presenter PT has been made toward the screen SC.

To be more specific, the presentation apparatus 10 performs matching processing between the captured image SG1 (see FIG. 11) and a comparative image IG2 (not shown). Note that the comparative image IG2 (not shown) is a still image obtained by the camera 20 capturing in advance the presenter PT from the side in a state in which the presenter PT directs the face directed toward the screen SC.

As result of the matching between the captured image SG1 and the image IG2, if it has been determined that the orientation of the face of the presenter PT at the time of detection of the gesture GT is the orientation D2, the procedure proceeds to step S17. In step S17, the processing for distributing the presentation material BP to the display output apparatus 30 (see FIG. 9) is executed. Note that the processing for distributing the presentation material BP to the display output apparatus 30 will also be described later in detail.

On the other hand, as a result of the matching between the captured image SG1 and the image IG2, if it has been determined that the orientation of the face at the time of detection of the gesture GT is not the orientation D2, the procedure proceeds to step S18.

In step S18, it is determined whether or not to end the presentation. If it has been determined that the presentation is to end, the processing ends, and otherwise the procedure returns to step S13.

Next, the processing for distributing the presentation material BP to the listener terminals 70 (70A to 70D) (step S15 in FIG. 7) will be described with reference to the flowchart of FIG. 8.

Figure 8:
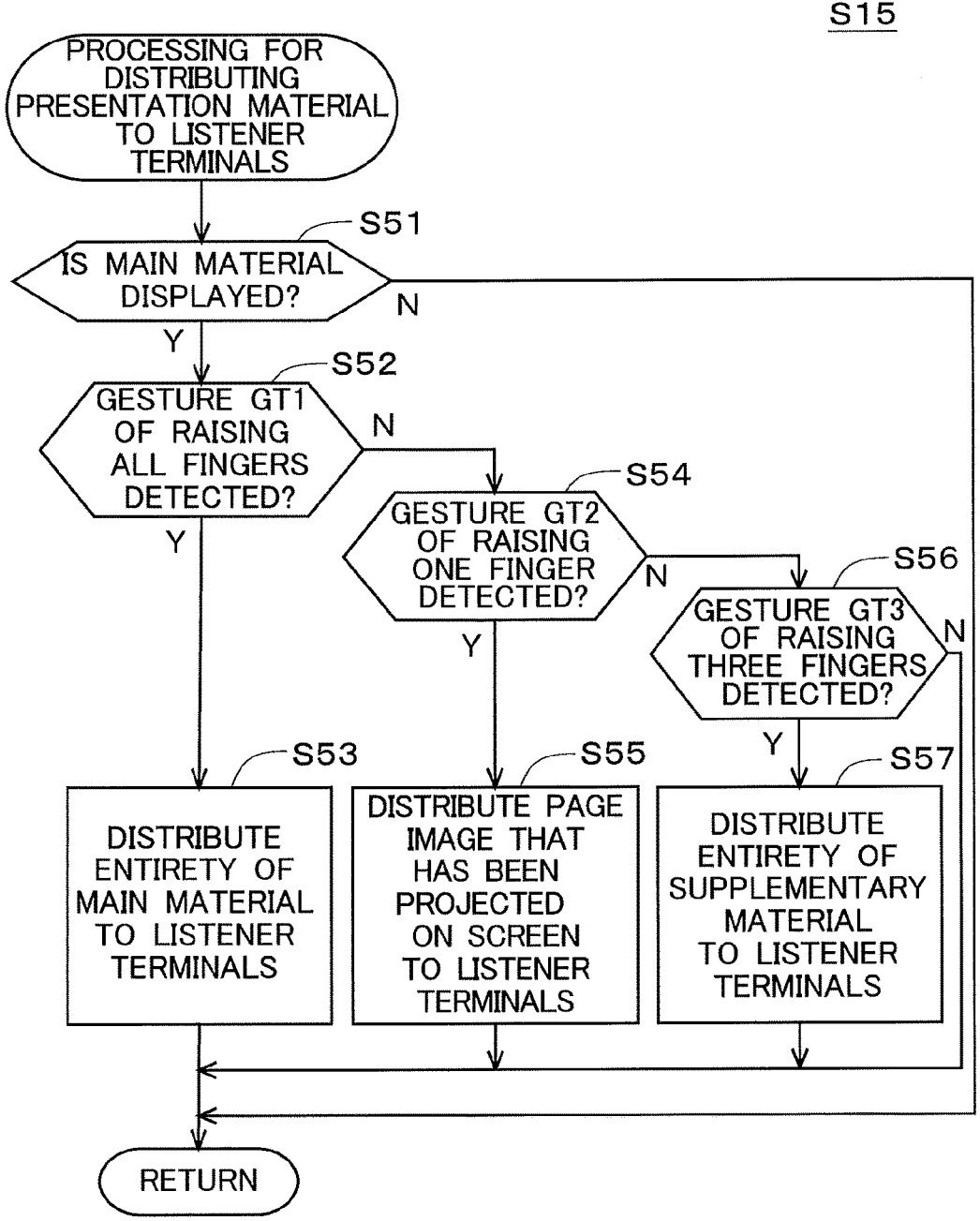
FIG. 8 is a flowchart showing an operation for distributing presentation material to listener terminals.

First, in step S51 in FIG. 8, it is determined whether or not the main material MP (specifically, a page image of the main material MP) is displayed on the screen SC. If it has been determined that the main material MP is displayed on the screen SC, the procedure proceeds to step S52. If, on the other hand, it has been determined that the main material MP is not displayed on the screen SC, the processing shown in the flowchart of FIG. 8 (processing of step S15 in FIG. 7) ends, and the procedure proceeds to step S16 in FIG. 7.

Figure 12:
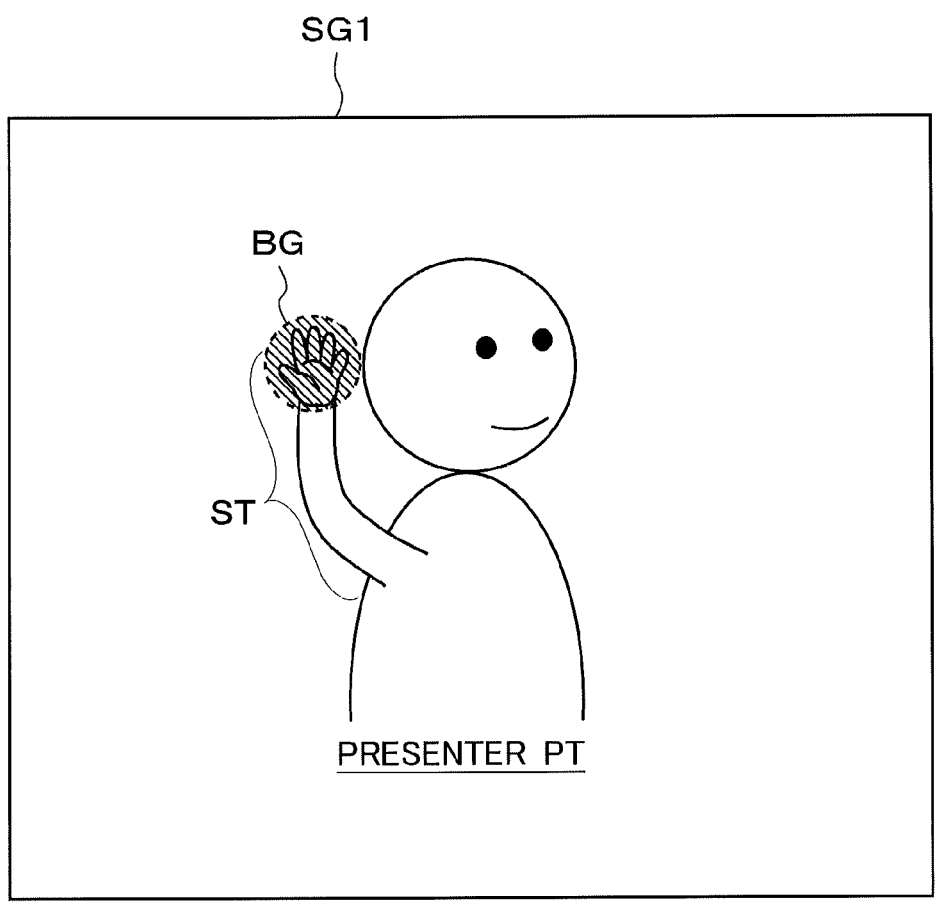
FIG. 12 shows an image captured by the camera.

In step S52, it is determined whether or not the presenter PT has made a gesture GT in which he/she raises all fingers (hereinafter also referred to as the "gesture GT1"). To be more specific, whether or not the gesture GT1 has been made is determined by performing matching processing between a partial image BG (see FIG. 12) and a comparative image JG1 (see FIG. 13). As shown in FIG. 12, the partial image BG is an image in the vicinity of the end of the arm, and more specifically, an image of a certain area around the end of the portion ST that extends from the body of the presenter PT (e.g., an area of a circle having a radius of 15 cm in terms of the actual air clearance). Furthermore, the comparative image JG1 is, as shown in FIG. 13, a still image obtained by capturing in advance a state in which the presenter PT raises all fingers.

As a result of the matching between the partial image BG and the comparative image JG1, if it has been determined that the gesture GT1 has been made (the presenter PT is raising all fingers), the procedure proceeds to step S53. On the other hand, if it has been determined that the gesture GT1 has not been made, the procedure proceeds to step S54.

In step S53, the presentation apparatus 10 distributes the entirety of the main material MP (specifically, data of all pages of the main material MP) to the listener terminals 70 (70A to 70D). As a result, the listeners UA to UD are able to appropriately browse all pages of the main material MP, using their listener terminals 70A to 70D.

In step S54, it is determined whether or not the presenter PT has made a gesture GT in which he/she raises one finger (hereinafter also referred to as the "gesture GT2"). To be more specific, whether or not the gesture GT2 has been made is determined by performing matching processing on the partial image BG (see FIG. 12) and a comparative image JG2 (see FIG. 14). As shown in FIG. 14, the comparative image JG2 is an image obtained by capturing in advance a state in which the presenter PT is raising one finger.

As a result of the matching between the partial image BG and the comparative image JG2, if it has been determined that the gesture GT2 has been made (the presenter PT is raising one finger), the procedure proceeds to step S55. On the other hand, if it has been determined that the gesture GT2 has not been made, the procedure proceeds to step S56.

In step S55, the presentation apparatus 10 distributes part of the main material MP (specifically, from among a plurality of pages of the main material MP, data of a page that is displayed on the screen SC) to the listener terminals 70 (70A to 70D). As a result, the listeners UA to UD are able to browse the page that is displayed on the screen SC, using their listener terminals 70A to 70D.

Figure 15:
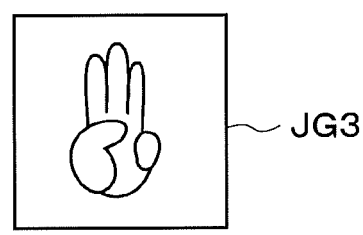
FIG. 15 shows a comparative image used in matching processing.
Figure 16:
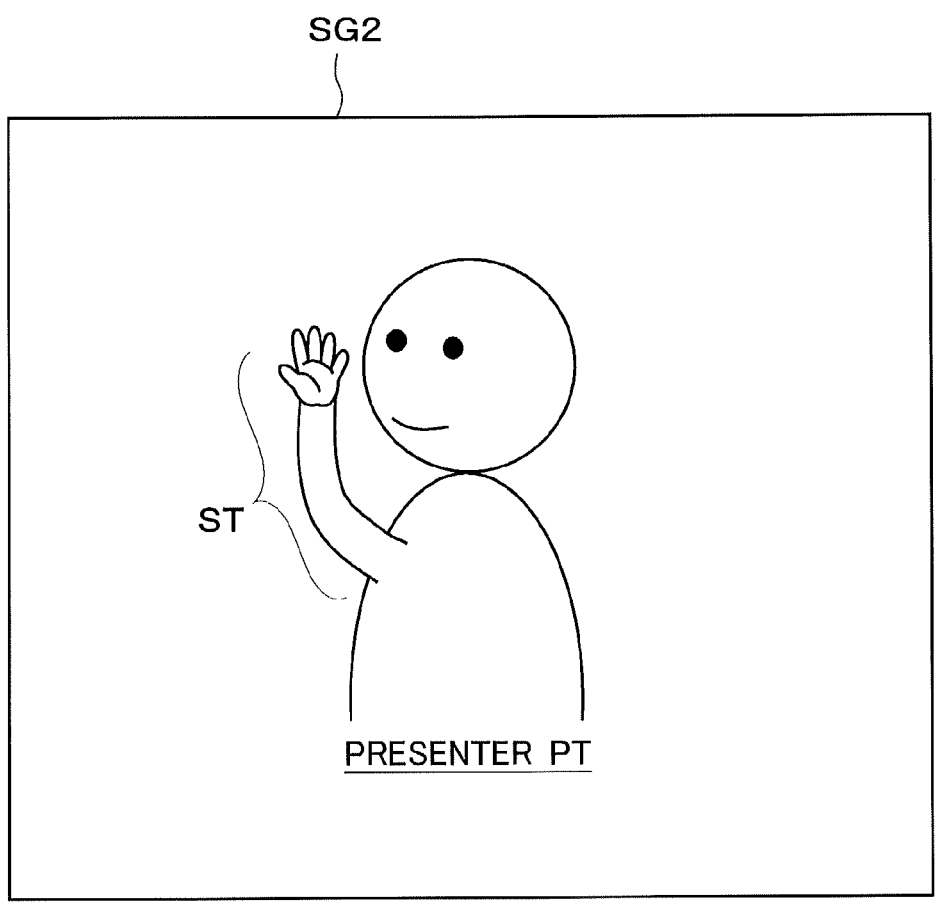
FIG. 16 shows an image captured by the camera.

In step S56, it is determined whether or not the presenter PT has made a gesture GT in which he/she raises three fingers (hereinafter also referred to as the "gesture GT3"). To be more specific, whether or not the gesture GT3 has been made is determined by performing matching processing between the partial image BG (see FIG. 12) and a comparative image JG3 (see FIG. 15). As shown in FIG. 15, the comparative image JG3 is an image obtained by capturing in advance a state in which the presenter PT is raising three fingers.

As a result of the matching between the partial image BG and the comparative image JG3, if it has been determined that the gesture GT3 has been made (the presenter PT is raising three fingers), the procedure proceeds to step S57. On the other hand, if it has been determined that the gesture GT3 has not been made, the processing shown in the flowchart of FIG. 8 (step S15 in FIG. 7) ends, and the procedure proceeds to step S16 in FIG. 7.

In step S57, the presentation apparatus 10 distributes the entirety of the supplementary material SP (specifically, data of all pages of the supplementary material SP) to the listener terminals 70 (70A to 70D). As a result, the listeners UA to UD are able to appropriately browse all pages of the supplementary material SP, using their listener terminals 70A to 70D.

Next, the processing for distributing the presentation material BP to the display output apparatus 30 (step S17 in FIG. 7) will be described with reference to the flowchart of FIG. 9.

Figure 17:
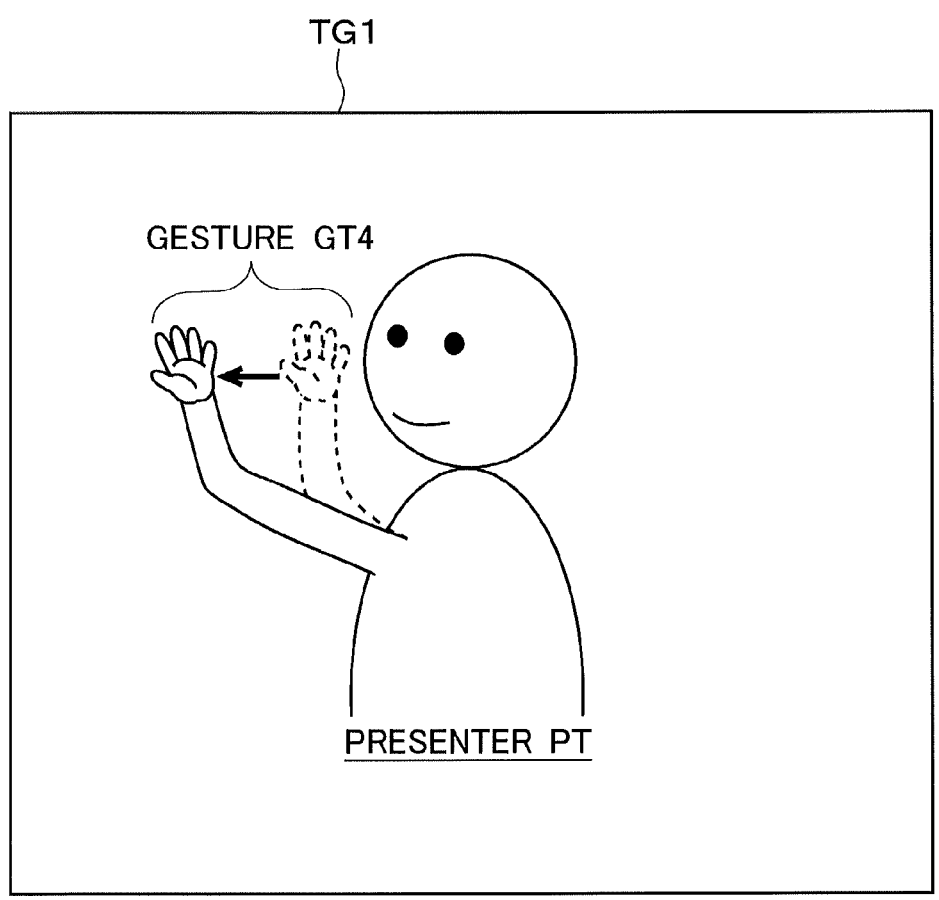
FIG. 17 shows an image captured by the camera.

In step S71, it is determined whether or not the presenter PT has made a gesture GT in which he/she who has raised the arm to beside the face moves that arm to the right as shown in FIG. 17 (hereinafter also referred to as the "gesture GT4").

To be more specific, whether or not the gesture GT4 has been made is determined by comparing an image SG2 (see FIG. 16) and an image TG1 (see FIG. 17). Note that the image SG2 is an image captured when the presenter PT has made the common action CA. In this image SG2, the orientation of the face of the presenter PT is the orientation D2. Furthermore, the image TG1 is an image captured after a predetermined period of time (e.g., 2 seconds) has elapsed after the image SG2 was captured.

Here, as shown in FIG. 17, when the arm position of the presenter PT in the image TG1 is rightward (leftward in the image SG2) of the arm position of the presenter PT in the image SG2 as viewed from the presenter PT, it is determined that the gesture GT4 has been made, and otherwise determined that the gesture GT4 has not been made. Note that, in the present example, the gesture GT4 is detected on condition that the orientation of the face of the presenter PT is the orientation D2. However, the present invention is not limited thereto, and the gesture GT4 may be detected without imposing the condition that the orientation of the face of the presenter PT is the orientation D2. To be more specific, whether or not the gesture GT4 has been made may be determined by just comparing the image SG2 and the image TG1, irrespective of whether or not the orientation of the face of the presenter PT is the orientation D2.

If it has been determined that the gesture GT4 has been made, the procedure proceeds to step S72, in which data of a page NP next to the page that is currently projected on the screen SC is distributed to the display output apparatus 30, and a page image of the next page NP is projected on the screen SC.

Figure 20:
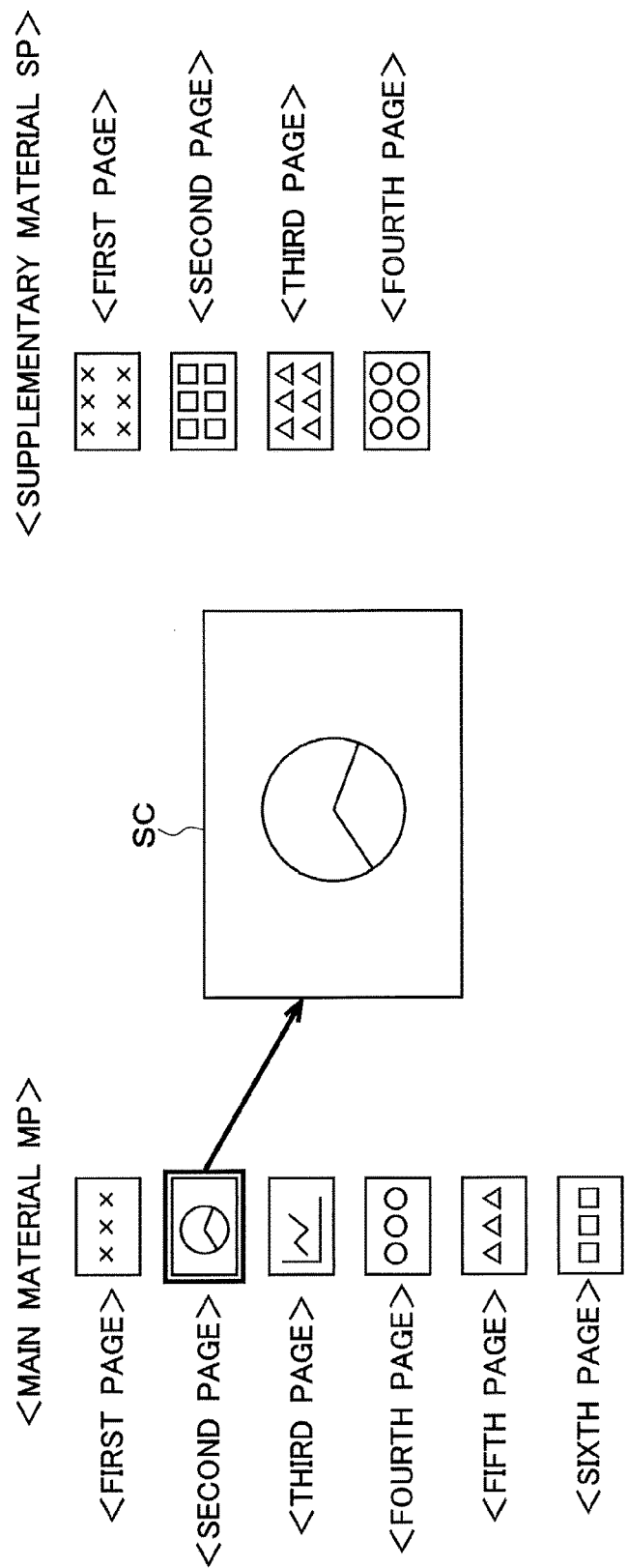
FIG. 20 is a conceptual diagram showing a page image displayed on the screen.
Figure 21:
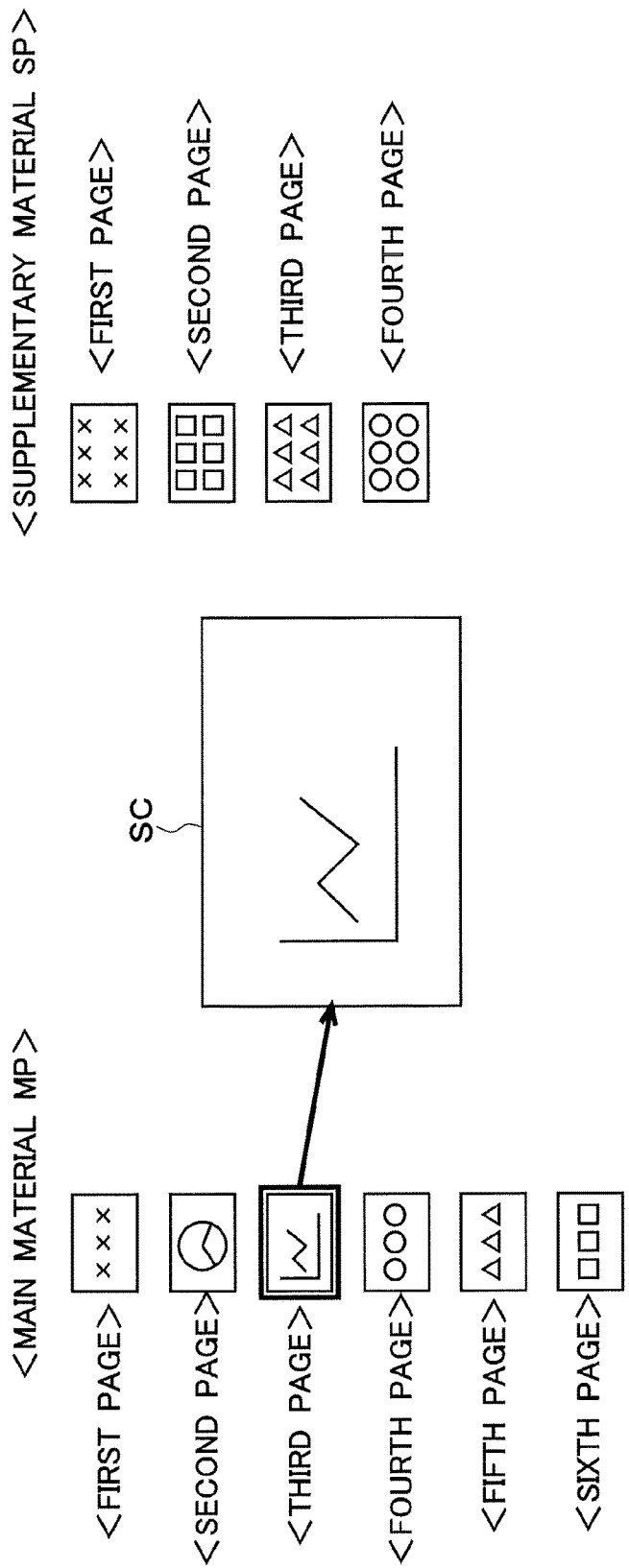
FIG. 21 is a conceptual diagram showing a page image displayed on the screen.

For example, a case is considered in which, when a page image of the second page of the main material MP is projected on the screen SC as shown in FIG. 20, it has been determined that the presenter PT has made the gesture GT4. In this case, a page image of the third page, which is the page NP next to the second page of the main material MP that is currently projected, is newly projected on the screen SC as shown in FIG. 21.

On the other hand, if it has been determined that the gesture GT4 has not been made, the procedure proceeds to step S73. In step S73, it is determined whether or not the presenter PT has made a gesture GT in which he/she who has raised the arm to beside the face moves that arm to the left (hereinafter also referred to as the "gesture GT5") (see FIG. 18).

Figure 18:
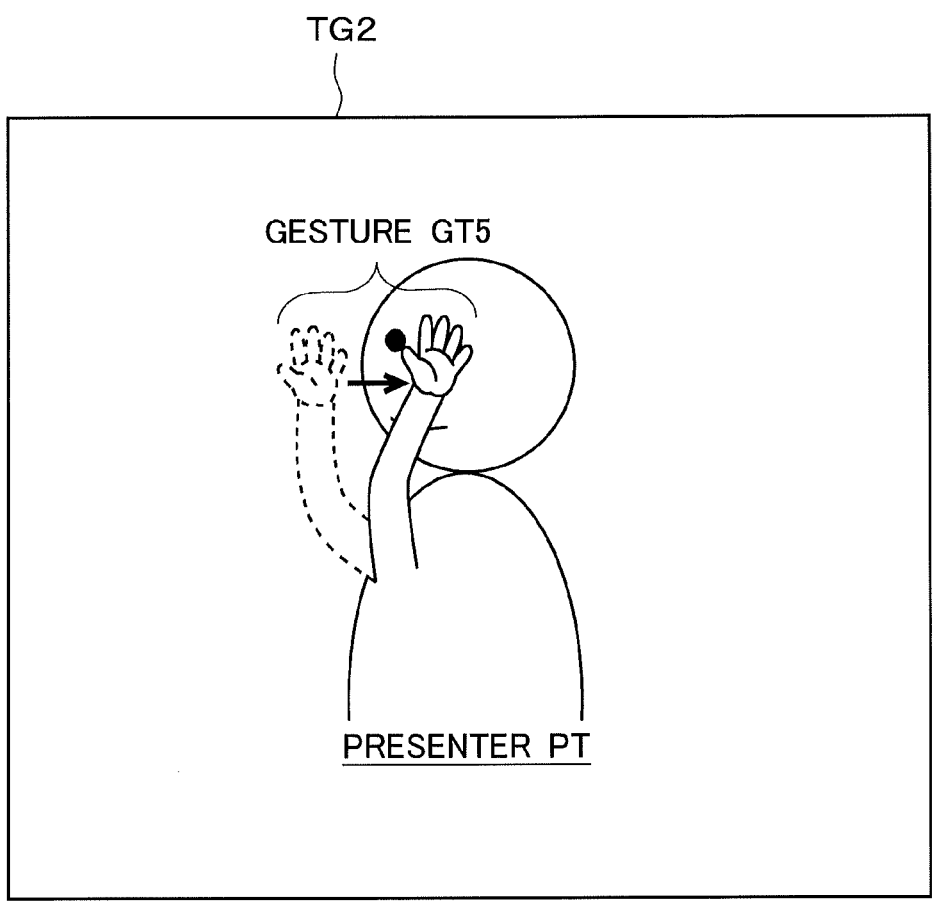
FIG. 18 shows an image captured by the camera.

To be more specific, whether or not the gesture GT5 has been made is determined by comparing the image SG2 (see FIG. 16) and an image TG2 (see FIG. 18). Note that the image TG2 is an image captured after a predetermined period of time (e.g., 2 seconds) has elapsed after the image SG2 was captured.

Here, when the arm position of the presenter PT in the image TG2 is leftward (rightward in the image SG2) of the arm position of the presenter PT in the image SG2 as viewed from the presenter PT as shown in FIG. 18, it is determined that the gesture GT5 has been made, and otherwise determined that the gesture GT5 has not been made.

If it has been determined that the gesture GT5 has been made, the procedure proceeds to step S74, in which data of a page PP previous to the page that is currently projected on the screen SC is distributed to the display output apparatus 30, and a page image of the previous page PP is projected on the screen SC.

For example, a case is considered in which, when the page image of the third page of the main material MP is projected on the screen SC as shown in FIG. 21, it has been determined that the presenter PT had made the gesture GT5. In this case, the page image of the second page, which is the page previous to the third page of the main material MP that is currently projected, is newly projected on the screen SC as shown in FIG. 20.

On the other hand, if it has been determined that the gesture GT5 has not been made, the procedure proceeds to step S75.

In step S75, it is determined whether or not the presenter PT has made a gesture GT in which he/she who has raised the arm to beside the face further raises that arm upward (hereinafter also referred to as the "gesture GT6") (see FIG. 19).

Figure 19:
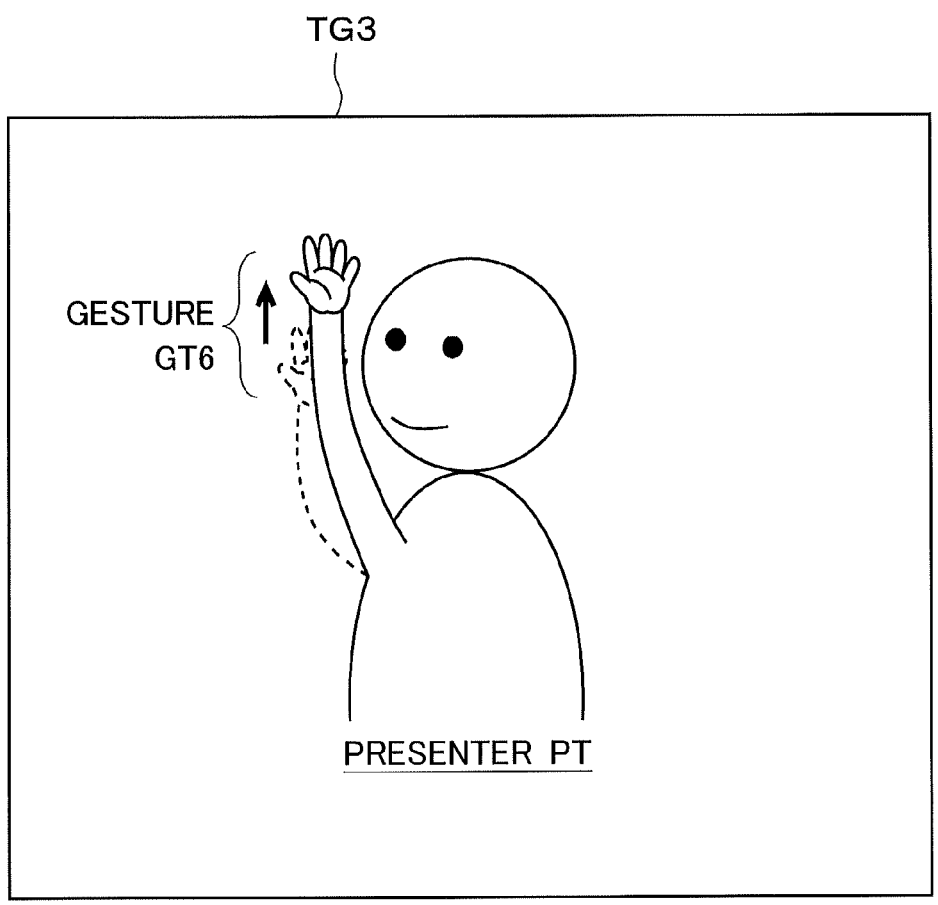
FIG. 19 shows an image captured by the camera.

To be more specific, whether or not the gesture GT6 has been made is determined by comparing the image SG2 (see FIG. 16) and an image TG3 (see FIG. 19). As described above, the common action CA is an action in which the presenter PT raises an arm with the elbow bent to a position higher than that just beside the face. The gesture GT6 is an action following the common action CA, and specifically, an action in which the arm raised in the common action CA is further raised to a higher position. The image SG2 is an image captured when the presenter PT has made the common action CA, and the image TG3 is an image captured after a predetermined period of time (e.g., two seconds) has elapsed after the image SG2 was captured.

If the arm position of the presenter PT in the image TG3 is further above the arm position of the presenter PT in the image SG2 as shown in FIG. 19, it is determined that the gesture GT6 has been made, and otherwise determined that the gesture GT6 has not been made.

Figure 9:
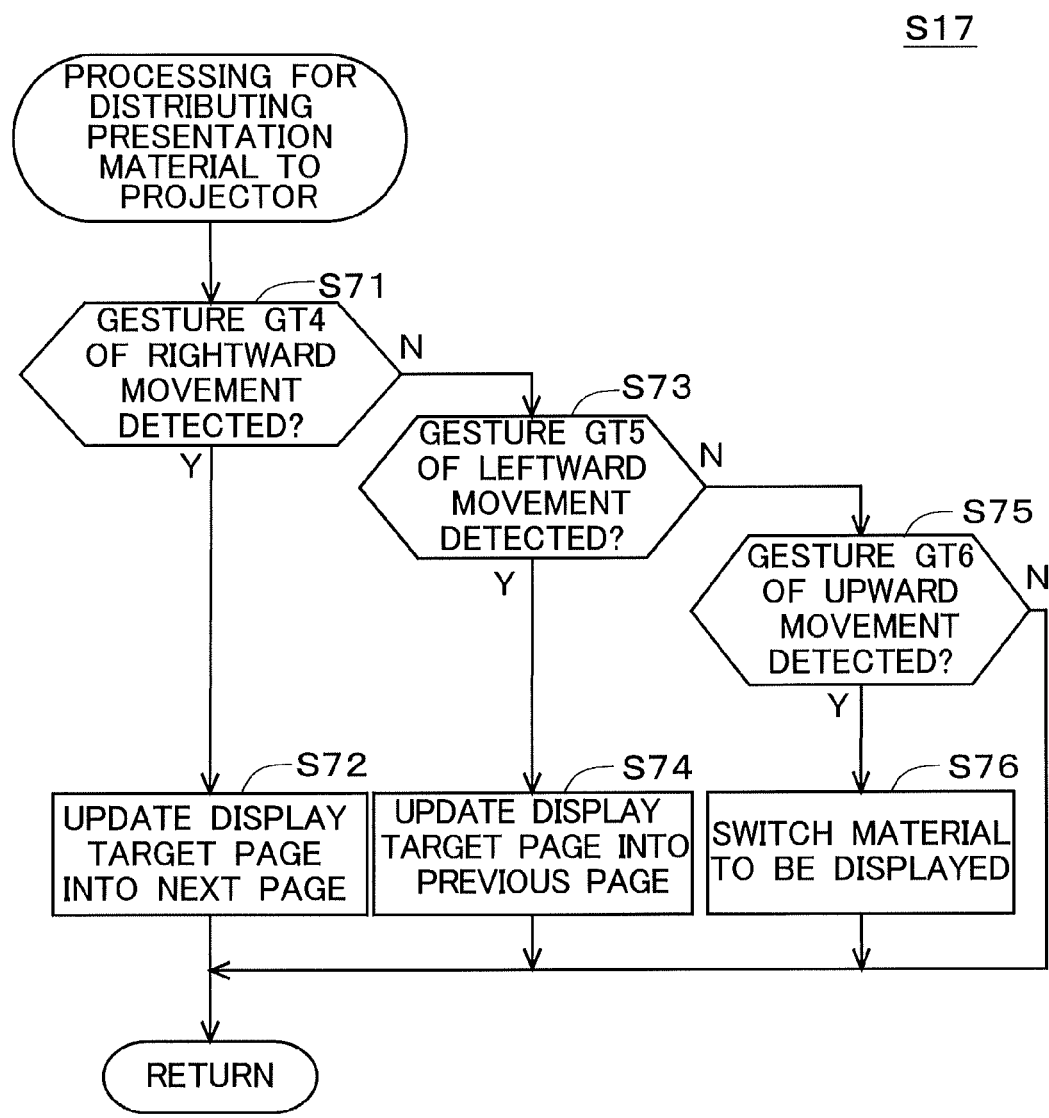
FIG. 9 is a flowchart showing an operation for distributing presentation material to a projector.

If it has been determined that the gesture GT6 has been made, the procedure proceeds to step S76, and if it has been determined that the gesture GT6 has not been made, the processing shown in the flowchart of FIG. 9 (processing of step S17 in FIG. 7) ends, and the procedure proceeds to step S18 in FIG. 7.

In step S76, an operation for switching the material to be displayed by the display output apparatus 30 between the main material MP and the supplementary material SP is performed. To be more specific, in the case where a page image of the main material MP is projected on the screen SC, a page image of the supplementary material SP is distributed to the display output apparatus 30 and then projected on the screen SC. Conversely, in the case where a page image of the supplementary material SP is projected on the screen SC, a page image of the main material MP is distributed to the display output apparatus 30 and then projected on the screen SC.

Figure 22:
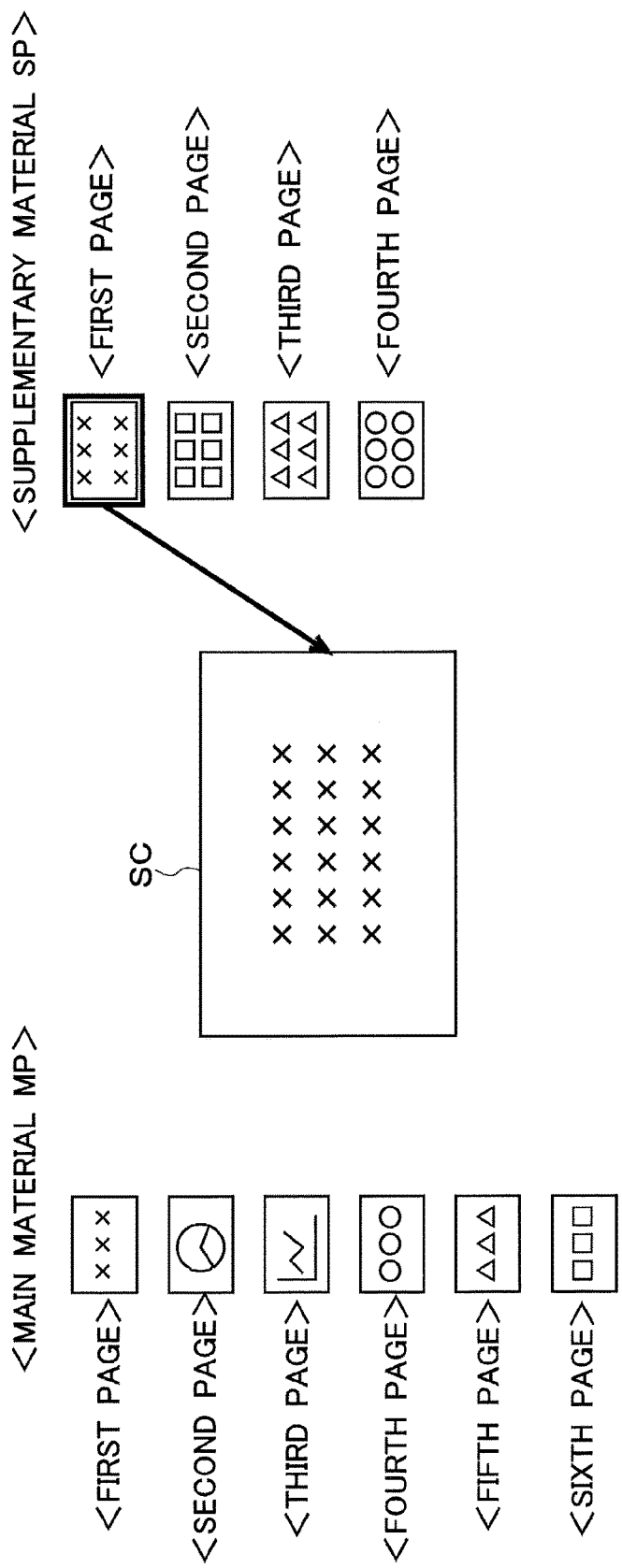
FIG. 22 is a conceptual diagram showing a page image displayed on the screen.

For example, a case is considered in which the page image of the third page of the main material MP is displayed on the screen SC as shown in FIG. 21. Here, if the presenter PT has made the gesture GT6 for the first time, a page image of the first page of the supplementary material SP is distributed to the display output apparatus 30 and displayed on the screen SC as shown in FIG. 22 (step S76 in FIG. 9).

Figure 23:
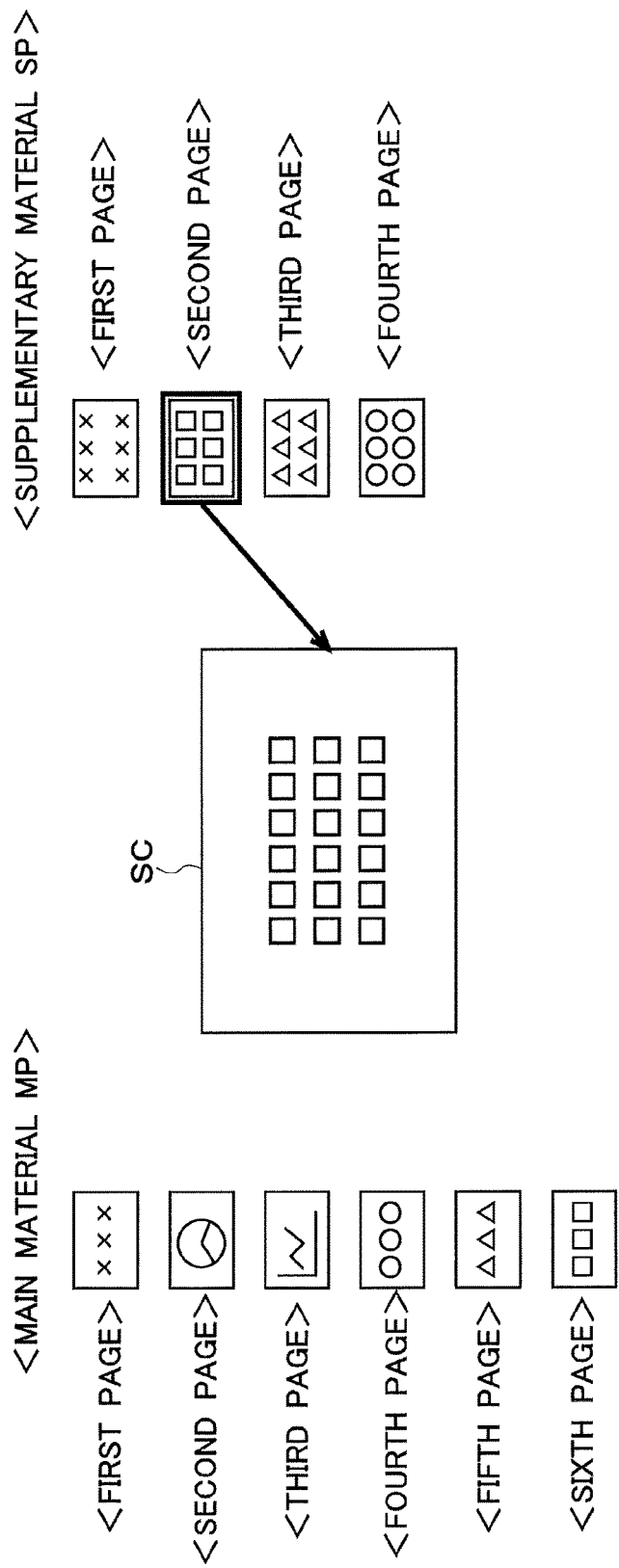
FIG. 23 is a conceptual diagram showing a page image displayed on the screen.

Thereafter, if the presenter PT has made the gesture GT4 during display of the page image of the first page of the supplementary material SP, a page image of the second page of the supplementary material SP is distributed to the display output apparatus 30 and displayed on the screen SC as shown in FIG. 23 (step S72 in FIG. 9).

Furthermore, if the presenter PT has made the gesture GT6 for the second time during display of the second page of the supplementary material SP, the page image of the third page of the main material MP, which was displayed before the display of the supplementary material SP, is distributed to the display output apparatus 30 and again displayed on the screen SC as shown in FIG. 21.

Figure 24:
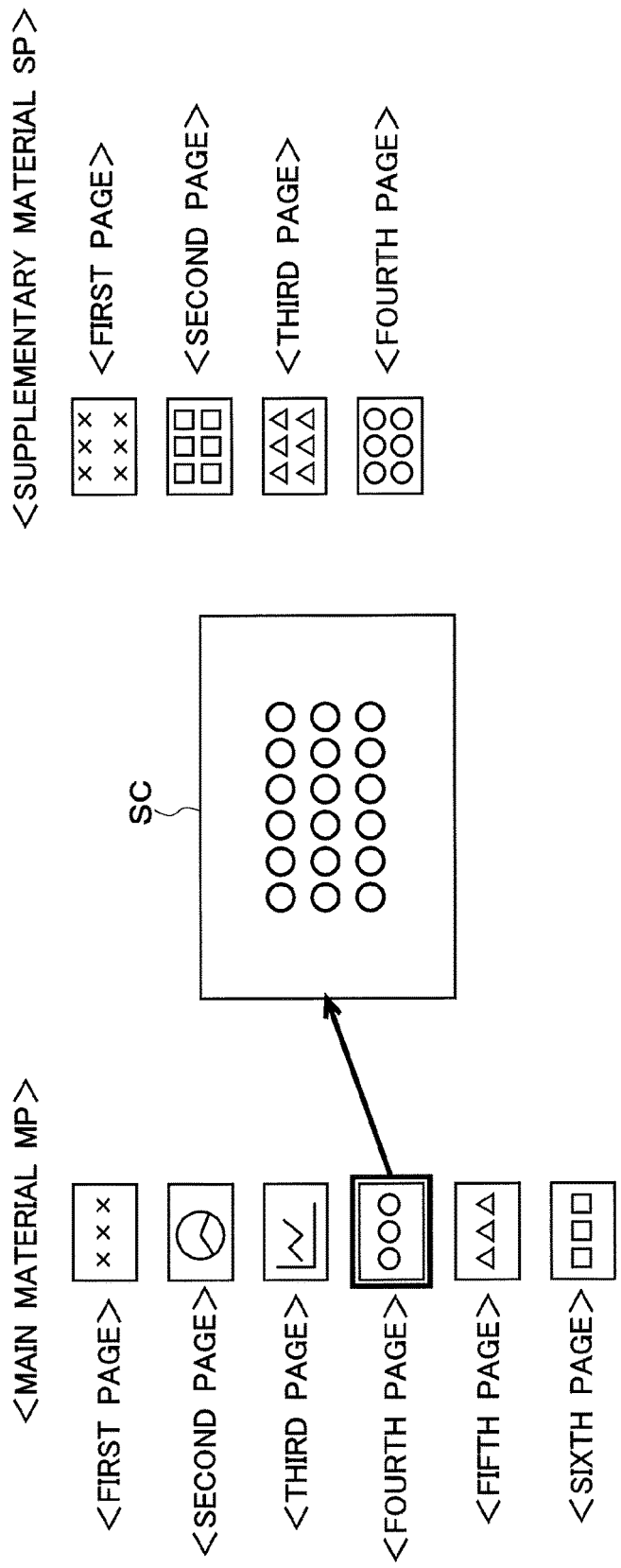
FIG. 24 is a conceptual diagram showing a page image displayed on the screen.

Thereafter, if the presenter PT has made the gesture GT4 during display of the third page of the main material MP, a page image of the fourth page of the main material MP is distributed to the display output apparatus 30 and displayed on the screen SC as shown in FIG. 24 (step S72 in FIG. 9).

Furthermore, if the presenter PT has made the gesture GT6 for the third time during display of the fourth page of the main material MP, the page image of the second page of the supplementary material SP, which was displayed before the display of the main material MP, is distributed to the display output apparatus 30 and again displayed on the screen SC as shown in FIG. 23 (step S76 in FIG. 9).

According to the operations described above, the detection of the gesture GT of the presenter PT is started in response to the instruction to start a presentation (step S12 in FIG. 7). Thus, it is possible to avoid a situation in which a gesture GT made before the start of the presentation is erroneously detected.

Furthermore, the distribution destination of the presentation material BP is determined based on the orientation of the face of the presenter PT at the time of detection of the gesture GT (see steps S14 and S16, for example). Thus, the presenter PT can easily determine the distribution destination.

In particular, if it has been determined that the orientation of the face is the orientation D1 (orientation directed from the position where the presenter PT is present toward the listeners UA to UD), the distribution destination of the presentation material BP is determined to be the listener terminals 70A to 70D. In other words, the orientation of the face of the presenter PT (orientation D1) and the distribution destination (listener terminals 70A to 70D) of the presentation material BP are closely related to each other. Accordingly, it is possible for the presenter PT to intuitively recognize the relationship between the orientation of the face when giving a gesture GT and the distribution destination of the presentation material BP.

Similarly, if it has been determined that the orientation of the face is the orientation D2 (orientation directed from the position where the presenter PT is present toward the screen SC), the distribution destination of the presentation material BP is determined to be the display output apparatus 30. In other words, the orientation of the face of the presenter PT (orientation D2) and the distribution destination of the presentation material BP (display output apparatus 30) are closely related to each other. Accordingly, it is possible for the presenter PT to intuitively recognize the relationship between the orientation of the face when giving a gesture GT and the distribution destination of the presentation material BP.

Furthermore, in the operations described above, the operation for distributing the presentation material BP is controlled in accordance with the gestures GT1 to GT6. It is thus possible for the presenter PT to instruct the distribution of the presentation material BP through a simple operation using the gestures GT1 to GT6.

To be more specific, whether all pages of the material to be distributed or part (single page) of the pages of the material to be distributed is to be used as a distribution target page is determined based on the details of detection of the gesture GT (specifically, whether the gesture GT1 or the gesture GT2 has been detected) (step S15). Accordingly, using the gestures GT1 and GT2 (specifically, selectively using the two) allows the presenter PT to switch whether the entirety (all pages) of material (in the present example, the main material MP) specified from among the presentation material BP or part (single page currently displayed) of the specified material is to be used as a distribution target page.

Furthermore, whether the main material MP or the supplementary material SP is to be used as the material to be distributed is determined based on the details of detection of the gesture GT (specifically, which one of the gestures GT1, GT2, and GT3 has been detected). Accordingly, using the gestures GT1, GT2, and GT3 (selectively using the three) allows the presenter PT to change which one of the main material MP and the supplementary material SP is to be used as the material to be distributed (e.g., the supplementary material SP).

In particular, by using the gesture GT3, the presenter PT can also instruct to distribute, from among the main material MP and the supplementary material SP, the entirety (all pages) of the material that is not displayed (e.g., supplementary material SP), as the material to be distributed.

Furthermore, the material to be distributed (in other words, the material to be displayed on the screen SC) is changed based on the details of detection of the gesture GT (specifically, the detection of the gesture GT6). Accordingly, by using the gesture GT6, the presenter PT can switch the material to be distributed, in other words, can switch between the main material MP and the supplementary material SP as the material to be displayed on the screen SC.

Moreover, whether the page PP previous to the page displayed on the screen SC or the page NP next to the displayed page is to be used as the distribution target page is determined based on the details of detection of the gesture GT (specifically, which one of the gestures GT4 and GT5 has been detected). Accordingly, using the gestures GT4 and GT5 (selectively using the two) allows the presenter PT to instruct an operation for changing the currently displayed page of the currently displayed material (e.g., the main material MP) among the presentation material BP.

Furthermore, in the above-described embodiment, the types of the gestures GT1 to GT6 are distinguished based on both the unique action (arm and/or finger action) following the common action CA and the orientation of the face of the presenter PT. It is thus possible to improve the accuracy of distinction among the gestures GT1 to GT6 as compared with the case where the above six types of gestures GT1 to GT6 are distinguished without giving consideration to the orientation of the face.

3. Variations

While the above has been a description of an embodiment of the present invention, the present invention is not intended to be limited to that described above.

For example, while the above embodiment illustrates the case in which the presentation material BP is distributed to the listener terminals 70 on condition that the main material MP is displayed, the present invention is not limited thereto, and a configuration is also possible in which the presentation material BP is distributed to the listener terminals 70 on condition that the supplementary material SP is displayed. Below is a detailed description of this variation with reference to FIG. 25.

Figure 25:
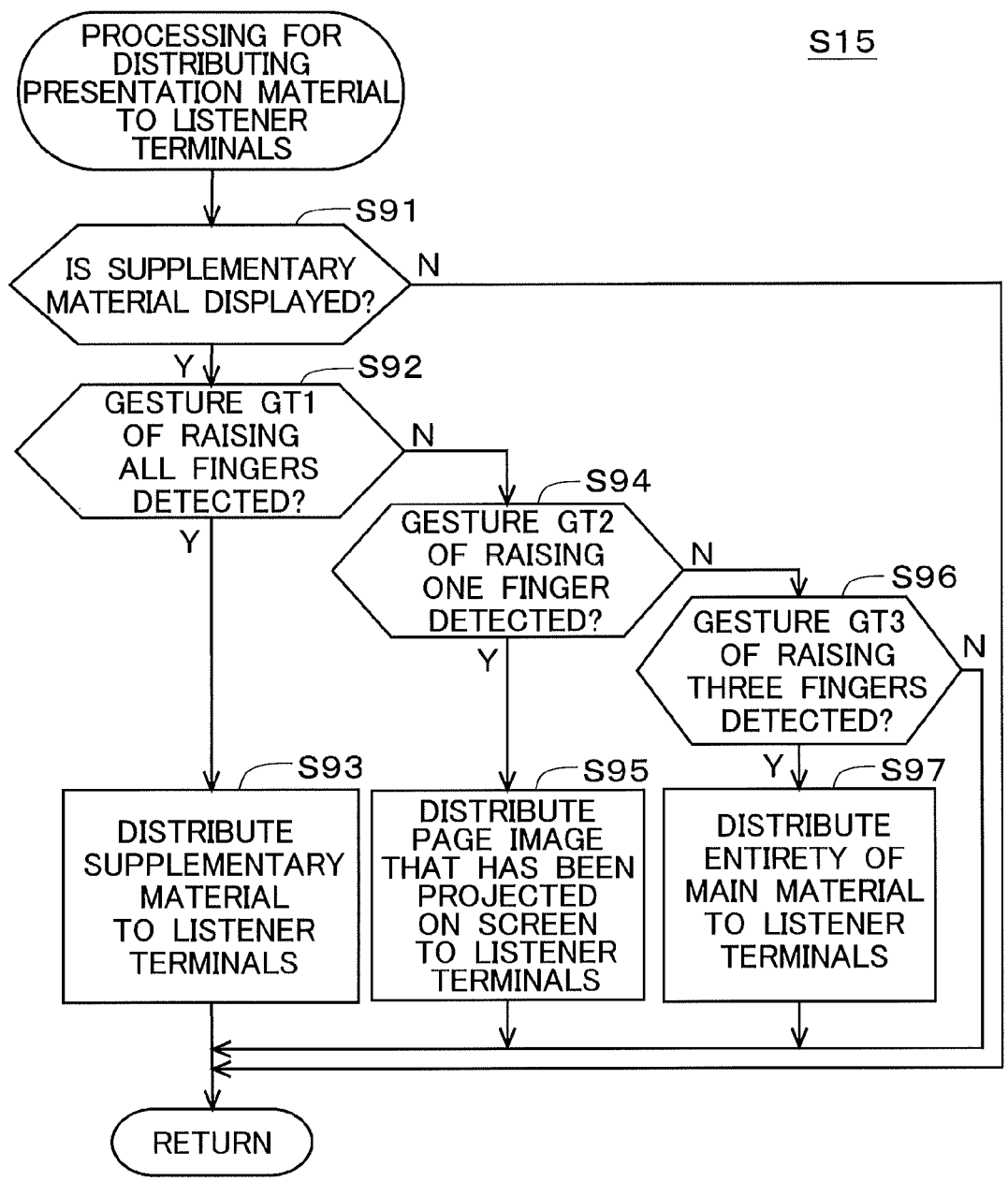
FIG. 25 is a flowchart showing an operation for distributing presentation material to the listener terminals.

According to this variation, step S15 in FIG. 25 is executed instead of step S15 in FIG. 8.

First, in step S91 in FIG. 25, it is determined whether or not the supplementary material SP (specifically, a page image of the supplementary material SP) is displayed on the screen SC. If it has been determined that the supplementary material SP is displayed on the screen SC, the procedure proceeds to step S92. On the other hand, if it has been determined that the supplementary material SP is not displayed on the screen SC, the processing shown in the flowchart of FIG. 25 (processing of step S15 in FIG. 7) ends, and the procedure proceeds to step S16 in FIG. 7.

In step S92, it is determined whether or not the gesture GT1 has been made. If it has been determined that the gesture GT1 has been made (the presenter PT is raising all fingers), the procedure proceeds to step S93. On the other hand, if it has been determined that the gesture GT1 has not been made (the presenter PT is not raising all fingers), the procedure proceeds to step S94.

In step S93, the presentation apparatus 10 distributes the entirety of the supplementary material SP (specifically, data of all pages of the supplementary material SP) to the listener terminals 70 (70A to 70D). As a result, the listeners UA to UD are able to appropriately browse all pages of the supplementary material SP, using their listener terminals 70A to 70D.

In step S94, it is determined whether or not the gesture GT2 has been made. If it has been determined that the gesture GT2 has been made (the presenter PT is raising one finger), the procedure proceeds to step S95. On the other hand, if it has been determined that the gesture GT2 has not been made (the presenter PT is not raising one finger), the procedure proceeds to step S96.

In step S95, the presentation apparatus 10 distributes part of the supplementary material SP (specifically, from among a plurality of pages of the supplementary material SP, data of a page that is displayed on the screen SC) to the listener terminals 70 (70A to 70D). As a result, the listeners UA to UD are able to browse the page of the supplementary material SP that is displayed on the screen SC, using their listener terminals 70A to 70D.

In step S96, it is determined whether or not the gesture GT3 has been made. If it has been determined that the gesture GT3 has been made (the presenter PT is raising three fingers), the procedure proceeds to step S97. On the other hand, if it has been determined that the gesture GT3 has not been made (the presenter PT is not raising three fingers), the processing shown in the flowchart of FIG. 25 (step S15 in FIG. 7) ends, and the procedure proceeds to step S16 in FIG. 7.

In step S97, the presentation apparatus 10 distributes the entirety of the main material MP (specifically, data of all pages of the main material MP) to the listener terminals 70 (70A to 70D). As a result, the listeners UA to UD are able to appropriately browse all pages of the main material MP, using their listener terminals 70A to 70D.

This variation (FIG. 25) illustrates the case in which the distribution operations corresponding to the gestures GT1 to GT3 are performed on condition that the supplementary material SP is displayed on the screen SC, whereas the above embodiment (FIG. 8) illustrates the case in which the distribution operations corresponding to the gestures GT1 to GT3 are performed on condition that the main material MP is displayed on the screen SC. However, the present invention is not limited to these examples, and a distribution operation in accordance with the type of material that is displayed on the screen SC may be performed in the case where either the supplementary material SP or the main material MP is displayed on the screen SC. In short, the operation of FIG. 25 and the operation of FIG. 8 may be executed in combination.

Figure 26:
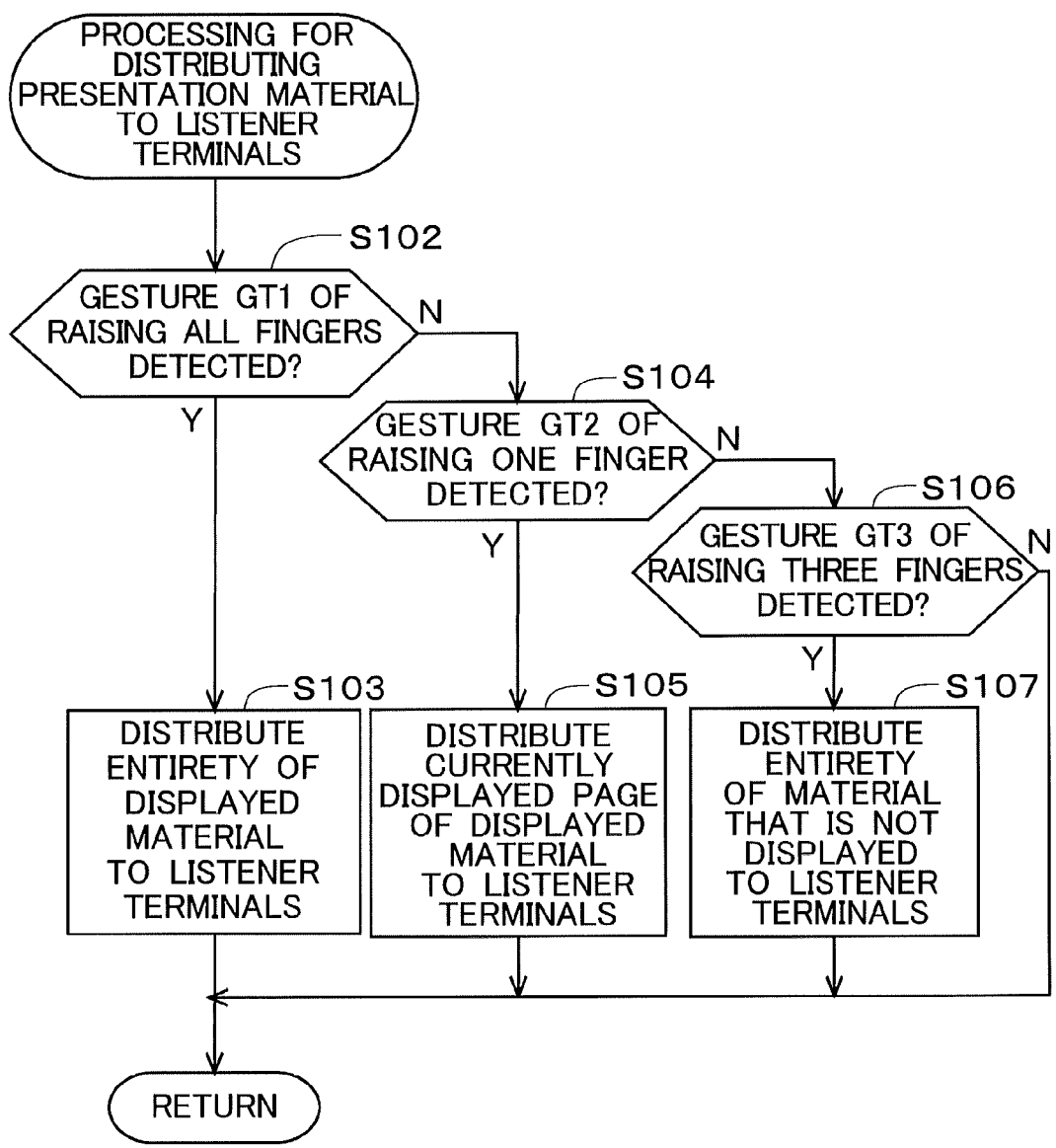
FIG. 26 is a flowchart showing an operation for distributing presentation material to the listener terminals.

More specifically, as shown in FIG. 26, when the gesture GT1 has been detected, data of the entirety (all pages) of material that is displayed on the screen SC, from among the main material MP and the supplementary material SP, may be distributed (step S103). Similarly, when the gesture GT2 has been detected, data of part (only the displayed page) of the material that is displayed on the screen SC, from among the main material MP and the supplementary material SP, may be distributed (step S105). Furthermore, when the gesture GT3 has been detected, data of the entirety (all pages) of the other material that is different from the material being displayed on the screen SC (the main material MP or the supplementary material SP) may be distributed (step S107). To be more specific, a configuration is possible in which, when the gesture GT3 has been detected, if the main material MP is displayed on the screen SC, data of the entirety (all pages) of the other material (i.e., supplementary material SP) is distributed, and if the supplementary material SP is displayed on the screen SC, data of the entirety (all pages) of the other material (i.e., main material MP) is distributed.

Furthermore, while the above embodiment and the like illustrate the case in which the gestures GT1 to GT6 are distinguished (identified) by also giving consideration to the orientation of the face of the presenter PT, the present invention is not limited to this example. For example, a plurality of gestures GT may be distinguished (identified) based on only the unique action (arm and/or finger action) following the common action CA, without giving consideration to the orientation of the face of the presenter PT. For example, the above plural types of gestures GT1 to GT6 (or other plural types of gestures) may be distinguished from one another without giving consideration to the orientation of the face of the presenter PT. In this case, it is sufficient to distribute target data to a distribution destination that is predetermined per gesture. For example, the predetermined distribution destination for the gestures GT1 to GT3 may be the listener terminals 70 (70A to 70D), and the predetermined distribution destination for the gestures GT4 to GT6 may be the display output apparatus 30.

Furthermore, while the above embodiment illustrates the case in which the type of the material to be distributed (the main material MP or the supplementary material SP) and the distribution target page (all pages or a single page) are changed in accordance with the type of the gesture GT, the present invention is not limited to this. For example, a configuration is possible in which predetermined data (e.g., data of the currently displayed page of the material that is displayed on the screen SC) is distributed when a single gesture GT10 (e.g., a gesture consisting of only the common action CA) has been detected. Furthermore, in this case, the distribution destination may be changed in accordance with the orientation of the face of the presenter PT when the gesture GT10 has been made, as in the above-described embodiment The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A presentation system for controlling the distribution of presentation materials, the system comprising:
   an image capturing apparatus for capturing an image of a presenter;
   a processor configured to:
   receive a start instruction to start a presentation;
   detect an orientation of a face of the presenter using the image capturing apparatus and at the same time detect a distribution gesture of the presenter using the image capturing apparatus,
   based on a detected orientation of the face of the presenter, determine a distribution destination of the presentation material;
   based on the detected distribution gesture of the presenter, determine what presentation material is to be distributed; and
   control an operation for distributing the presentation material determined to be distributed to the determined distribution destination.

2. The presentation system according to claim 1, wherein the processor distributes the presentation material to a listener terminal on condition that the orientation of the face is a first orientation that is directed from a position where the presenter is present toward a listener, the listener terminal being a terminal of the listener; and
   wherein the processor distributes a different type of data of the presentation material for each type of the distribution gesture.

3. The presentation system according to claim 2, wherein on condition that a first gesture is detected by the processor, the processor distributes data of all pages of material specified from among the presentation material, to the listener terminal.

4. The presentation system according to claim 3, wherein the presentation material includes main material and supplementary material, and
   in a case where the first gesture is detected, if the main material is displayed on a display surface on which an image output from a display output unit is displayed, the processor distributes data of all pages of the main material to the listener terminal, and if the supplementary material is displayed on the display surface, the processor distributes data of all pages of the supplementary material to the listener terminal.

5. The presentation system according to claim 2, wherein on condition that a second gesture is detected by the processor, the processor distributes, from among a plurality of pages of the presentation material, data of a page that is displayed on a display surface on which an image output from a display output unit is displayed, to the listener terminal.

6. The presentation system according to claim 5, wherein the presentation material includes main material and supplementary material, and
   in a case where the second gesture is detected, if the main material is displayed on the display surface, the processor distributes, from among a plurality of pages of the main material, data of a page that is displayed on the display surface, to the listener terminal, and if the supplementary material is displayed on the display surface, the processor distributes, from among a plurality of pages of the supplementary material, data of a page that is displayed on the display surface, to the listener terminal.

7. The presentation system according to claim 2, wherein the presentation material includes main material and supplementary material, in a case where a third gesture is detected by the processor, if the main material is displayed on a display surface on which an image output from a display output unit is displayed, the processor distributes entirety of the supplementary material to the listener terminal, and if the supplementary material is displayed on the display surface, the processor distributes entirety of the main material to the listener terminal.

8. The presentation system according to claim 1, wherein the processor distributes the presentation material to a display output unit on condition that the orientation of the face is a second orientation that is directed from a position where the presenter is present toward a display surface on which an image output from the display output unit is displayed, and wherein the processor distributes a different type of data of the presentation material for each type of the distribution gesture.

9. The presentation system according to claim 8, wherein on condition that a fourth gesture is detected by the detection unit, the processor distributes, from among a plurality of pages of the presentation material, data of a page next to a page that is displayed on the display surface, to the display output unit.

10. The presentation system according to claim 8, wherein on condition that a fifth gesture is detected by the detection unit, the processor distributes, from among a plurality of pages of the presentation material, data of a page previous to a page that is displayed on the display surface, to the display output unit.

11. The presentation system according to claim 8, wherein the presentation material includes main material and supplementary material, and in a case where a sixth gesture is detected by the detection unit, if the main material is displayed on the display surface, the processor distributes the supplementary material to the display output unit, and if the supplementary material is displayed on the display surface, the processor distributes the main material to the display output unit.

12. The presentation system according to claim 1, wherein the processor determines material to be distributed, based on the detail of detection.

13. The presentation system according to claim 12, wherein the control unit determines whether main material or supplementary material is to be used as the material to be distributed, based on the detail of detection.

14. The presentation system according to claim 1, wherein the processor determines a distribution target page of material to be distributed, based on the detail of detection.

15. The presentation system according to claim 14, wherein the control unit determines whether all pages of the material to be distributed or part of the pages of the material to be distributed is to be used as the distribution target page, based on the detail of detection.

16. The presentation system according to claim 7, wherein the processor determines whether a page next to a page that is displayed on a display surface on which an image output from a display output unit is displayed, or a page previous to the page displayed on the display surface is to be used as the distribution target page, based on the detail of detection.

17. The presentation system according to claim 1, wherein the processor detects a hand or an arm of the presenter as the distribution gesture.

18. A presentation apparatus for controlling the distribution of presentation materials, the system comprising:

a processor configured to:

receive a start instruction to start a presentation;

detect an orientation of a face of the presenter and at the same time detect a distribution gesture of the presenter, based on a detected orientation of the face of the presenter, determine a distribution destination of the presentation material;

based on the detected distribution gesture of the presenter, determine what presentation material is to be distributed; and control an operation for distributing the presentation material determined to be distributed to the determined distribution destination.

19. The presentation apparatus according to claim 18, wherein the processor distributes the presentation material to a listener terminal on condition that the orientation of the face is a first orientation that is directed from a position where the presenter is present toward a listener, the listener terminal being a terminal of the listener; and wherein the processor distributes a different type of data of the presentation material for each type of the distribution gesture.

20. The presentation apparatus according to claim 19, wherein on condition that a first gesture is detected by the processor, the processor distributes data of all pages of material specified from among the presentation material, to the listener terminal.

21. The presentation apparatus according to claim 20, wherein the presentation material includes main material and supplementary material, and in a case where the first gesture is detected, if the main material is displayed on a display surface on which an image output from a display output unit is displayed, the processor distributes data of all pages of the main material to the listener terminal, and if the supplementary material is displayed on the display surface, the processor distributes data of all pages of the supplementary material to the listener terminal.

22. The presentation apparatus according to claim 19, wherein on condition that a second gesture is detected by the processor, the processor distributes, from among a plurality of pages of the presentation material, data of a page that is displayed on a display surface on which an image output from a display output unit is displayed, to the listener terminal.

23. The presentation apparatus according to claim 22, wherein the presentation material includes main material and supplementary material, and in a case where the second gesture is detected, if the main material is displayed on the display surface, the processor distributes, from among a plurality of pages of the main material, data of a page that is displayed on the display surface, to the listener terminal, and if the supplementary material is displayed on the display surface, the processor distributes, from among a plurality of pages of the supplementary material, data of a page that is displayed on the display surface, to the listener terminal.

24. The presentation apparatus according to claim 19, wherein
the presentation material includes main material and supplementary material,
in a case where a third gesture is detected by the processor, if the main material is displayed on a display surface on which an image output from a display output unit is displayed, the processor distributes entirety of the supplementary material to the listener terminal, and if the supplementary material is displayed on the display surface, the processor distributes entirety of the main material to the listener terminal.

25. The presentation apparatus according to claim 18, wherein
the processor distributes the presentation material to a display output unit on condition that the orientation of the face is a second orientation that is directed from a position where the presenter is present toward a display surface on which an image output from the display output unit is displayed, and
wherein the processor distributes a different type of data of the presentation material for each type of the distribution gesture.

26. The presentation apparatus according to claim 25, wherein
on condition that a fourth gesture is detected by the detection unit, the processor distributes, from among a plurality of pages of the presentation material, data of a page next to a page that is displayed on the display surface, to the display output unit.

27. The presentation apparatus according to claim 25, wherein
on condition that a fifth gesture is detected by the detection unit, the processor distributes, from among a plurality of pages of the presentation material, data of a page previous to a page that is displayed on the display surface, to the display output unit.

28. The presentation apparatus according to claim 25, wherein
the presentation material includes main material and supplementary material, and
in a case where a sixth gesture is detected by the detection unit, if the main material is displayed on the display surface, the processor distributes the supplementary material to the display output unit, and if the supplementary material is displayed on the display surface, the processor distributes the main material to the display output unit.

29. The presentation apparatus according to claim 18, wherein the processor detects a hand or an arm of the presenter as the distribution gesture.

30. A non-transitory computer-readable recording medium that records a program for causing a computer to execute the steps of:
receiving a start instruction to start a presentation;
detect an orientation of a face of a presenter using the image capturing apparatus and at the same time detect a distribution gesture of the presenter using the image capturing apparatus,
based on a detected orientation of the face of the presenter, determine a distribution destination of the presentation material;
based on the detected distribution gesture of the presenter, determine what presentation material is to be distributed; and
control an operation for distributing the presentation material determined to be distributed to the determined distribution destination.

31. The non-transitory computer-readable recording medium according to claim 30, wherein
the computer distributes the presentation material to a listener terminal on condition that the orientation of the face is a first orientation that is directed from a position where the presenter is present toward a listener, the listener terminal being a terminal of the listener; and
wherein the computer distributes a different type of data of the presentation material for each type of the distribution gesture.

32. The non-transitory computer-readable recording medium according to claim 31, wherein
on condition that a first gesture is detected by the computer, the computer distributes data of all pages of material specified from among the presentation material, to the listener terminal.

33. The non-transitory computer-readable recording medium according to claim 32, wherein
the presentation material includes main material and supplementary material, and
in a case where the first gesture is detected, if the main material is displayed on a display surface on which an image output from a display output unit is displayed, the computer distributes data of all pages of the main material to the listener terminal, and if the supplementary material is displayed on the display surface, the computer distributes data of all pages of the supplementary material to the listener terminal.

34. The non-transitory computer-readable recording medium according to claim 31, wherein
on condition that a second gesture is detected by the computer, the computer distributes, from among a plurality of pages of the presentation material, data of a page that is displayed on a display surface on which an image output from a display output unit is displayed, to the listener terminal.

35. The non-transitory computer-readable recording medium according to claim 34, wherein
the presentation material includes main material and supplementary material, and
in a case where the second gesture is detected, if the main material is displayed on the display surface, the computer distributes, from among a plurality of pages of the main material, data of a page that is displayed on the display surface, to the listener terminal, and if the supplementary material is displayed on the display surface, the computer distributes, from among a plurality of pages of the supplementary material, data of a page that is displayed on the display surface, to the listener terminal.

36. The non-transitory computer-readable recording medium according to claim 31, wherein
the presentation material includes main material and supplementary material,
in a case where a third gesture is detected by the computer, if the main material is displayed on a display surface on which an image output from a display output unit is displayed, the computer distributes entirety of the supplementary material to the listener terminal, and if the supplementary material is displayed on the display surface, the processor distributes entirety of the main material to the listener terminal.

37. The non-transitory computer-readable recording medium according to claim 30, wherein
the computer distributes the presentation material to a display output unit on condition that the orientation of the face is a second orientation that is directed from a position where the presenter is present toward a display surface on which an image output from the display output unit is displayed, and
wherein the computer distributes a different type of data of the presentation material for each type of the distribution gesture.

38. The non-transitory computer-readable recording medium according to claim 37, wherein
on condition that a fourth gesture is detected by the detection unit, the computer distributes, from among a plurality of pages of the presentation material, data of a page next to a page that is displayed on the display surface, to the display output unit.

39. The non-transitory computer-readable recording medium according to claim 37, wherein
on condition that a fifth gesture is detected by the detection unit, the computer distributes, from among a plurality of pages of the presentation material, data of a page previous to a page that is displayed on the display surface, to the display output unit.

40. The non-transitory computer-readable recording medium according to claim 37, wherein
the presentation material includes main material and supplementary material, and
in a case where a sixth gesture is detected by the detection unit, if the main material is displayed on the display surface, the computer distributes the supplementary material to the display output unit, and if the supplementary material is displayed on the display surface, the computer distributes the main material to the display output unit.

41. The non-transitory computer-readable recording medium according to claim 30, wherein the processor detects a hand or an arm of the presenter as the distribution gesture.

42. A presentation system for controlling the distribution of presentation materials, the system comprising:
an image capturing apparatus for capturing an image of a presenter;
a processor configured to:
receive a start instruction to start a presentation;
detect an orientation of a face of a presenter using the image capturing apparatus, and at the same time, detect a distribution gesture of the presenter using the image capturing apparatus;
based on a detected orientation of the face of the presenter, determine a distribution destination for the presentation material;
based on the detected orientation of the face of the presenter and the detected distribution gesture of the presenter, determine what presentation material is to be distributed; and
control an operation for distributing the presentation material determined to be distributed to the determined distribution destination.

43. The presentation system according to claim 42, wherein the processor distributes the presentation material to a listener terminal on condition that the orientation of the face is a first orientation that is directed from a position where the presenter is present toward a listener, the listener terminal being a terminal of the listener; and
wherein the processor distributes a different type of data of the presentation material for each type of the distribution gesture.

44. The presentation system according to claim 42, wherein
the processor distributes the presentation material to a display output unit on condition that the orientation of the face is a second orientation that is directed from a position where the presenter is present toward a display surface on which an image output from the display output unit is displayed, and
wherein the processor distributes a different type of data of the presentation material for each type of the distribution gesture.

45. The presentation system according to claim 42, wherein the processor detects a hand or an arm of the presenter as the distribution gesture.

46. A presentation apparatus for controlling the distribution of presentation materials, the system comprising:
a processor configured to:
receive a start instruction to start a presentation;
detect an orientation of a face of a presenter, and at the same time, detect a distribution gesture of the presenter;
based on a detected orientation of the face of the presenter, determine a distribution destination for the presentation material;
based on the detected orientation of the face of the presenter and the detected distribution gesture of the presenter, determine what presentation material is to be distributed; and
control an operation for distributing the presentation material determined to be distributed to the determined distribution destination.

47. The presentation apparatus according to claim 46, wherein
the processor distributes the presentation material to a listener terminal on condition that the orientation of the face is a first orientation that is directed from a position where the presenter is present toward a listener, the listener terminal being a terminal of the listener; and
wherein the processor distributes a different type of data of the presentation material for each type of the distribution gesture.

48. The presentation apparatus according to claim 46, wherein
the processor distributes the presentation material to a display output unit on condition that the orientation of the face is a second orientation that is directed from a position where the presenter is present toward a display surface on which an image output from the display output unit is displayed, and
wherein the processor distributes a different type of data of the presentation material for each type of the distribution gesture.

49. The presentation apparatus according to claim 46, wherein the processor detects a hand or an arm of the presenter as the distribution gesture.

50. A non-transitory computer-readable recording medium that records a program for causing a computer to execute the steps of:

an image capturing apparatus for capturing an image of a presenter;
a processor configured to:
receive a start instruction to start a presentation;
detect an orientation of a face of a presenter sing the image capturing apparatus, and at the same time, detect a distribution gesture of the presenter using the image capturing apparatus;
based on a detected orientation of the face of the presenter, determine a distribution destination for the presentation material;
based on the detected orientation of the face of the presenter and the detected distribution gesture of the presenter, determine what presentation material is to be distributed; and
control an operation for distributing the presentation material determined to be distributed to the determined distribution destination.

* * * * *